US010468713B2

(12) United States Patent
Katagiri et al.

(10) Patent No.: US 10,468,713 B2
(45) Date of Patent: Nov. 5, 2019

(54) BINDER COMPOSITION FOR NON-AQUEOUS SECONDARY BATTERY POSITIVE ELECTRODE, COMPOSITION FOR NON-AQUEOUS SECONDARY BATTERY POSITIVE ELECTRODE, POSITIVE ELECTRODE FOR NON-AQUEOUS SECONDARY BATTERY, AND NON-AQUEOUS SECONDARY BATTERY, AND METHODS FOR PRODUCING COMPOSITION FOR NON-AQUEOUS SECONDARY BATTERY POSITIVE ELECTRODE, POSITIVE ELECTRODE FOR NON-AQUEOUS SECONDARY BATTERY, AND NON-AQUEOUS SECONDARY BATTERY

(71) Applicant: ZEON CORPORATION, Chiyoda-ku, Tokyo (JP)

(72) Inventors: Maki Katagiri, Tokyo (JP); Yasuhiro Wakizaka, Tokyo (JP); Mayumi Fukumine, Tokyo (JP)

(73) Assignee: ZEON CORPORATION, Chiyoda-ku, Tokyo (JP)

( * ) Notice: Subject to any disclaimer, the term of this patent is extended or adjusted under 35 U.S.C. 154(b) by 188 days.

(21) Appl. No.: 15/535,662

(22) PCT Filed: Dec. 25, 2015

(86) PCT No.: PCT/JP2015/006481
§ 371 (c)(1),
(2) Date: Jun. 13, 2017

(87) PCT Pub. No.: WO2016/103730
PCT Pub. Date: Jun. 30, 2016

(65) Prior Publication Data
US 2017/0352915 A1   Dec. 7, 2017

(30) Foreign Application Priority Data

Dec. 26, 2014  (JP) ................................ 2014-265547
Nov. 20, 2015  (JP) ................................ 2015-227822

(51) Int. Cl.
| H01M 10/0525 | (2010.01) |
| H01M 4/62 | (2006.01) |
| H01M 10/058 | (2010.01) |
| H01M 4/04 | (2006.01) |
| H01M 4/13 | (2010.01) |
| C08C 2/04 | (2006.01) |
| H01M 4/02 | (2006.01) |
| C08L 15/00 | (2006.01) |
| H01M 4/1391 | (2010.01) |

(52) U.S. Cl.
CPC ............ *H01M 10/0525* (2013.01); *C08C 2/04* (2013.01); *H01M 4/0404* (2013.01); *H01M 4/13* (2013.01); *H01M 4/621* (2013.01); *H01M 4/622* (2013.01); *H01M 4/623* (2013.01); *H01M 10/058* (2013.01); *C08L 15/005* (2013.01); *H01M 4/1391* (2013.01); *H01M 2004/028* (2013.01)

(58) Field of Classification Search
CPC ............ H01M 4/62; H01M 4/04; H01M 4/13; H01M 4/02; H01M 10/0525; H01M 10/058
See application file for complete search history.

(56) References Cited

U.S. PATENT DOCUMENTS

| 10,033,042 | B2 | 7/2018 | Fukumine et al. |
| 2004/0091773 | A1 | 5/2004 | Boczer et al. |
| 2004/0113320 | A1 | 6/2004 | Guerin et al. |
| 2008/0089013 | A1* | 4/2008 | Zhong ................. C04B 35/532 361/502 |
| 2009/0227444 | A1 | 9/2009 | Ong et al. |
| 2011/0171526 | A1 | 7/2011 | Wakizaka et al. |
| 2013/0183577 | A1 | 7/2013 | Hutchinson |
| 2013/0230748 | A1 | 9/2013 | Minami et al. |
| 2013/0252102 | A1 | 9/2013 | Kobayakawa et al. |
| 2015/0050555 | A1 | 2/2015 | Fukumine et al. |

FOREIGN PATENT DOCUMENTS

| CN | 1717824 A | 1/2006 |
| CN | 101463097 A | 6/2009 |
| CN | 103227346 A | 7/2013 |
| CN | 104137311 A | 11/2014 |
| EP | 2072532 A1 | 6/2009 |
| EP | 2072533 A1 | 6/2009 |
| EP | 2555306 A1 | 2/2013 |
| EP | 2680349 A1 | 1/2014 |
| JP | 2006505914 A | 2/2006 |
| JP | 2009149893 A | 7/2009 |
| JP | 4509792 B2 | 7/2010 |
| JP | 2012204303 A | 10/2012 |
| JP | 2013157086 A | 8/2013 |
| JP | 2013157155 A | 8/2013 |
| JP | 2013165033 A | 8/2013 |
| JP | 2013225488 A | 10/2013 |
| KR | 20110060900 A | 6/2011 |
| KR | 20140142694 A | 12/2014 |
| WO | 2010032784 A1 | 3/2010 |
| WO | 2012115096 A1 | 8/2012 |
| WO | 2013129658 A1 | 9/2013 |

OTHER PUBLICATIONS

Machine Translation of: JP 2013/157086 A, Sugimoto et al., Aug. 15, 2013.*

(Continued)

*Primary Examiner* — Kenneth J Douyette
(74) *Attorney, Agent, or Firm* — Kenja IP Law PC

(57) ABSTRACT

Provided is a binder composition for a non-aqueous secondary battery positive electrode that can form a positive electrode with which it is possible to obtain a non-aqueous secondary battery having excellent life characteristics even when aging treatment is carried out under low-temperature and low-depth of charge conditions. The binder composition contains a first binder, iron, and at least one of ruthenium and rhodium. The total iron, ruthenium, and rhodium content is no greater than $5 \times 10^{-3}$ parts by mass per 100 parts by mass of the first binder.

19 Claims, No Drawings

(56) References Cited

OTHER PUBLICATIONS

Machine Translation of: JP 2013/165033 A, Maekawa et al., Aug. 22, 2013.*
Mar. 15, 2016, International Search Report issued in the International Patent Application No. PCT/JP2015/006481.
Jun. 27, 2017, International Preliminary Report on Patentability issued in the International Patent Application No. PCT/JP2015/006481.
Aug. 30, 2017, Communication pursuant to Rule 114(2) EPC issued by the European Patent Office in the corresponding European Patent Application No. 15872301.5.
Jul. 25, 2018, Extended European Search Report issued by the European Patent Office in the corresponding European Patent Application No. 15872301.5.

* cited by examiner

BINDER COMPOSITION FOR NON-AQUEOUS SECONDARY BATTERY POSITIVE ELECTRODE, COMPOSITION FOR NON-AQUEOUS SECONDARY BATTERY POSITIVE ELECTRODE, POSITIVE ELECTRODE FOR NON-AQUEOUS SECONDARY BATTERY, AND NON-AQUEOUS SECONDARY BATTERY, AND METHODS FOR PRODUCING COMPOSITION FOR NON-AQUEOUS SECONDARY BATTERY POSITIVE ELECTRODE, POSITIVE ELECTRODE FOR NON-AQUEOUS SECONDARY BATTERY, AND NON-AQUEOUS SECONDARY BATTERY

TECHNICAL FIELD

This disclosure relates to a binder composition for a non-aqueous secondary battery positive electrode, a composition for a non-aqueous secondary battery positive electrode, a positive electrode for a non-aqueous secondary battery, and a non-aqueous secondary battery, and to methods for producing a composition for a non-aqueous secondary battery positive electrode, a positive electrode for a non-aqueous secondary battery, and a non-aqueous secondary battery.

BACKGROUND

Non-aqueous secondary batteries (non-aqueous electrolysis solution-containing secondary batteries), such as lithium ion secondary batteries, have characteristics such as compact size, light weight, high energy-density, and the ability to be repeatedly charged and discharged, and are used in a wide variety of applications. Consequently, in recent years, studies have been made to improve battery members such as electrodes for the purpose of achieving even higher non-aqueous secondary battery performance.

A positive electrode for a non-aqueous secondary battery generally includes a current collector and an electrode mixed material layer (positive electrode mixed material layer) formed on the current collector. The positive electrode mixed material layer is formed using, for example, a slurry composition that contains a positive electrode active material, a binder-containing binder composition, and so forth dispersed in a dispersion medium.

In order to further improve the performance of non-aqueous secondary batteries, attempts have been made in recent years to improve binder compositions used in positive electrode mixed material layer formation.

In one specific example, PTL 1 proposes a binder composition for a non-aqueous secondary battery positive electrode that can improve life characteristics of a non-aqueous secondary battery. The proposed binder composition contains a binder that is a hydrogenated polymer obtained through hydrogenation of a polymer including a conjugated diene monomer unit and a nitrile group-containing monomer unit, wherein the amount of platinum group elements, such as palladium, contained in the binder composition is no greater than $8\times10^{-4}$ parts by mass per 100 parts by mass of the hydrogenated polymer.

In another example, PTL 2 proposes a technique for inhibiting aggregation of a polymer contained in a binder composition as a binder and improving life characteristics of a non-aqueous secondary battery by limiting the content of particulate metal components (for example, Fe, Ni, Cr, and the like) in the binder composition to no greater than 10 mass ppm.

CITATION LIST

Patent Literature

PTL 1: JP 2013-157086 A
PTL 2: WO 2010/032784 A1

SUMMARY

Technical Problem

In production of a non-aqueous secondary battery, an assembled secondary battery is normally subjected to treatment (aging treatment) in which the secondary battery is charged to a specific depth of charge (state of charge; SOC) and is then stored at a specific temperature for a specific time to form a solid electrolyte interphase (SEI) film at the surface of an electrode active material and thereby improve life characteristics and the like of the secondary battery. The aging treatment is normally carried out under conditions of a depth of charge of from 20% to 30%, a temperature of at least 60° C., and a storage time of at least 10 hours.

There has been demand in recent years for this aging treatment to be carried out under low-temperature and low-depth of charge conditions to raise non-aqueous secondary battery production efficiency.

However, when aging treatment is carried out under low-temperature and low-depth of charge conditions, in the case of a secondary battery including a positive electrode that is produced using a conventional binder composition such as described above, it is not possible to form a good SEI film and thus it is not possible to sufficiently improve the life characteristics of the secondary battery.

Solution to Problem

The inventors conducted diligent investigation with the aim of enabling favorable formation of an SEI film and acquisition of a non-aqueous secondary battery having excellent life characteristics even when aging treatment is carried out under low-temperature and low-depth of charge conditions. Through this investigation, the inventors reached a new discovery that formation of an SEI film at the surface of an electrode active material is promoted when a binder composition for a non-aqueous secondary battery positive electrode contains iron and at least one of ruthenium and rhodium. The inventors then conducted further studies in relation to a secondary battery that includes a positive electrode formed using a binder composition containing iron and at least one of ruthenium and rhodium. The inventors discovered that by limiting the total iron, ruthenium, and rhodium content in the binder composition to no greater than a specific value, a good SEI film can be formed even when aging treatment is carried out under low-temperature and low-depth of charge conditions, and thus non-aqueous secondary battery life characteristics can be sufficiently improved. Furthermore, the inventors discovered that non-aqueous secondary battery life characteristics can be further improved by forming a positive electrode for a non-aqueous secondary battery using a fluorine-containing polymer in combination with a binder composition containing iron and at least one of ruthenium and rhodium. This disclosure is based on the new findings of the inventors set forth above.

Specifically, the present disclosure aims to advantageously solve the problems set forth above by disclosing a binder composition for a non-aqueous secondary battery positive electrode containing a first binder, iron, and at least one of ruthenium and rhodium, wherein total iron, ruthenium, and rhodium content is no greater than $5 \times 10^{-3}$ parts by mass per 100 parts by mass of the first binder. Through use of a binder composition that contains iron and at least one of ruthenium and rhodium, and in which the total iron, ruthenium, and rhodium content is no greater than a specific value as described above, it is possible to form a positive electrode with which a non-aqueous secondary battery having excellent life characteristics can be obtained even when aging treatment is carried out under low-temperature and low-depth of charge conditions.

Iron, ruthenium, and rhodium contents in the binder composition referred to in the present disclosure can be measured by ICP atomic emission spectroscopy (ICP-AES).

The presently disclosed binder composition for a non-aqueous secondary battery positive electrode preferably has an iron content of at least $4 \times 10^{-5}$ parts by mass and no greater than $4 \times 10^{-3}$ parts by mass per 100 parts by mass of the first binder. An iron content within the range set forth above enables formation of a good SEI film and can further improve non-aqueous secondary battery life characteristics.

The presently disclosed binder composition for a non-aqueous secondary battery positive electrode preferably has a total ruthenium and rhodium content of at least $4 \times 10^{-5}$ parts by mass and no greater than $4 \times 10^{-3}$ parts by mass per 100 parts by mass of the first binder. A total ruthenium and rhodium content within the range set forth above enables formation of a good SEI film and can further improve non-aqueous secondary battery life characteristics.

In the presently disclosed binder composition for a non-aqueous secondary battery positive electrode, the first binder preferably includes a polymer including an alkylene structural unit and a nitrile group-containing monomer unit. Through use of a binder composition for a non-aqueous secondary battery positive electrode that contains a polymer including an alkylene structural unit and a nitrile group-containing monomer unit as a first binder, non-aqueous secondary battery life characteristics can be further improved.

As used in the present disclosure, the phrase "includes a monomer unit" means that "a polymer obtained with the monomer includes a structural unit derived from the monomer".

In the presently disclosed binder composition for a non-aqueous secondary battery positive electrode, the polymer preferably has a degree of swelling in electrolysis solution of at least 200 mass % and no greater than 700 mass %. A degree of swelling of the polymer in electrolysis solution that is at least 200 mass % can ensure sufficient ion conductivity in a positive electrode mixed material layer of a positive electrode for a non-aqueous secondary battery that is formed using the binder composition, and enables formation of a good SEI film. Moreover, a degree of swelling of the polymer in electrolysis solution that is no greater than 700 mass % can lower the through-resistance of a positive electrode for a non-aqueous secondary battery formed using the binder composition.

The degree of swelling in electrolysis solution of the polymer referred to in the present disclosure can be measured using a measurement method described in the EXAMPLES section of the present specification.

In the presently disclosed binder composition for a non-aqueous secondary battery positive electrode, the polymer preferably has an iodine value of at least 0.01 mg/100 mg and no greater than 65 mg/100 mg. Through use of a binder composition for a non-aqueous secondary battery positive electrode containing a polymer that has an iodine value within the range set forth above, non-aqueous secondary battery output characteristics can be improved. Moreover, a polymer iodine value that is no greater than the upper limit set forth above enables further improvement of non-aqueous secondary battery life characteristics in a high-potential region.

The iodine value of the polymer referred to in the present disclosure can be measured in accordance with JIS K6235 (2006).

In the presently disclosed binder composition for a non-aqueous secondary battery positive electrode, the polymer preferably includes the alkylene structural unit in a proportion of at least 20 mass % and no greater than 90 mass % and preferably includes the nitrile group-containing monomer unit in a proportion of at least 10 mass % and no greater than 60 mass %. Through use of a binder composition for a non-aqueous secondary battery positive electrode that contains a polymer in which the proportions of an alkylene structural unit and a nitrile group-containing monomer unit are within the ranges set forth above, non-aqueous secondary battery life characteristics can be further improved.

Moreover, the present disclosure aims to advantageously solve the problems set forth above by disclosing a composition for a non-aqueous secondary battery positive electrode containing a positive electrode active material, a conductive material, and any of the above-described binder compositions for a non-aqueous secondary battery positive electrode. Through use of a composition for a positive electrode that contains the above-described binder composition, it is possible to form a positive electrode with which a non-aqueous secondary battery having excellent life characteristics can be obtained even when aging treatment is carried out under low-temperature and low-depth of charge conditions.

Moreover, the present disclosure aims to advantageously solve the problems set forth above by disclosing a composition for a non-aqueous secondary battery positive electrode containing any of the above-described binder compositions for a non-aqueous secondary battery positive electrode and a second binder, wherein the second binder includes a fluorine-containing polymer. Through use of a composition for a non-aqueous secondary battery positive electrode that contains both a fluorine-containing polymer and a binder composition containing iron and at least one of ruthenium and rhodium with a total iron, ruthenium, and rhodium content that is no greater than a specific value, it is possible to form a positive electrode with which a non-aqueous secondary battery having sufficiently good life characteristics can be obtained even when aging treatment is carried out under low-temperature and low-depth of charge conditions.

In the presently disclosed composition for a non-aqueous secondary battery positive electrode, the fluorine-containing polymer preferably has a melt viscosity of at least 1.0 kPa·s. Through use of a fluorine-containing polymer having a melt viscosity of at least 1.0 kPa·s, non-aqueous secondary battery life characteristics can be further improved.

The melt viscosity of the fluorine-containing polymer referred to in the present disclosure can be measured in accordance with ASTM D3835.

The presently disclosed composition for a non-aqueous secondary battery positive electrode preferably contains the second binder in a proportion of at least 50 mass % and no greater than 99.9 mass % relative to total content of the first binder and the second binder. When the second binder is contained in a proportion that is within the range set forth above, non-aqueous secondary battery life characteristics can be further improved.

In the presently disclosed composition for a non-aqueous secondary battery positive electrode, the fluorine-containing polymer preferably includes a vinylidene fluoride unit. Through use of a fluorine-containing polymer that includes a vinylidene fluoride unit, excessive swelling of the second binder in electrolysis solution can be inhibited and non-aqueous secondary battery output characteristics and life characteristics can be further improved.

The presently disclosed composition for a non-aqueous secondary battery positive electrode may be a conductive material paste that further contains a conductive material, an active material paste that further contains a positive electrode active material, or a slurry composition that further contains a positive electrode active material and a conductive material.

The presently disclosed composition for a non-aqueous secondary battery positive electrode can be produced through a method for producing a composition for a non-aqueous secondary battery positive electrode that includes mixing the binder composition for a non-aqueous secondary battery positive electrode and the second binder.

The mixing of the binder composition and the second binder may be carried out in the presence of other components such as a positive electrode active material and a conductive material, and, in this situation, the binder composition and/or the second binder may be pre-mixed with other components such as the positive electrode active material and the conductive material.

Furthermore, the present disclosure aims to advantageously solve the problems set forth above by disclosing a positive electrode for a non-aqueous secondary battery including a positive electrode mixed material layer formed using any of the above-described compositions for a non-aqueous secondary battery positive electrode that contains a positive electrode active material and a conductive material. Through use of a positive electrode including a positive electrode mixed material layer that is formed using any of the above-described compositions for a non-aqueous secondary battery positive electrode, a non-aqueous secondary battery having excellent life characteristics can be obtained even when aging treatment is carried out under low-temperature and low-depth of charge conditions.

Also, the present disclosure aims to advantageously solve the problems set forth above by disclosing a method for producing a positive electrode for a non-aqueous secondary battery, including: applying any of the above-described compositions for a non-aqueous secondary battery positive electrode that contains a positive electrode active material and a conductive material onto a current collector; and drying the composition for a non-aqueous secondary battery positive electrode that has been applied to form a positive electrode mixed material layer at a temperature of at least 120° C. By forming the positive electrode mixed material layer through drying of the composition for a non-aqueous secondary battery positive electrode that has been applied onto the current collector at a temperature of at least 120° C., the time required for formation of the positive electrode mixed material layer can be shortened, which enables efficient production of a positive electrode for a non-aqueous secondary battery. Moreover, through use of the above-described composition for a non-aqueous secondary battery positive electrode, it is possible to produce a positive electrode with which a non-aqueous secondary battery having excellent life characteristics can be obtained even when drying of the composition for a non-aqueous secondary battery positive electrode is carried out at a temperature of at least 120° C.

Moreover, the present disclosure aims to advantageously solve the problems set forth above by disclosing a non-aqueous secondary battery including the above-described positive electrode for a non-aqueous secondary battery, a negative electrode, an electrolysis solution, and a separator. Through use of the above-described positive electrode for a non-aqueous secondary battery in this manner, the non-aqueous secondary battery can be provided with excellent life characteristics even when aging treatment in production thereof is carried out under low-temperature and low-depth of charge conditions.

Furthermore, the present disclosure aims to advantageously solve the problems set forth above by disclosing a method for producing a non-aqueous secondary battery, including: assembling a non-aqueous secondary battery including the above-described positive electrode for a non-aqueous secondary battery, a negative electrode, an electrolysis solution, and a separator; and subjecting the non-aqueous secondary battery that has been assembled to aging treatment, wherein the aging treatment is carried out under conditions of a depth of charge of no greater than 13% and a temperature of no higher than 55° C. Carrying out aging treatment under low-temperature and low-depth of charge conditions in which the depth of charge is no greater than 13% and the temperature is no higher than 55° C. can shorten the time and reduce the cost required for aging treatment, which enables efficient production of a non-aqueous secondary battery. Moreover, through use of the above-described positive electrode for a non-aqueous secondary battery, a non-aqueous secondary battery having good life characteristics can be obtained even when the aging treatment is carried out under low-temperature and low-depth of charge conditions.

Advantageous Effect

According to the present disclosure, it is possible to provide a binder composition for a non-aqueous secondary battery positive electrode and a composition for a non-aqueous secondary battery positive electrode that can form a positive electrode with which it is possible to obtain a non-aqueous secondary battery having excellent life characteristics even when aging treatment is carried out under low-temperature and low-depth of charge conditions.

Moreover, according to the present disclosure, it is possible to provide a positive electrode for a non-aqueous secondary battery with which it is possible to obtain a non-aqueous secondary battery having excellent life characteristics even when aging treatment is carried out under low-temperature and low-depth of charge conditions.

Furthermore, according to the present disclosure, it is possible to provide a non-aqueous secondary battery having excellent life characteristics.

DETAILED DESCRIPTION

The following provides a detailed description of embodiments of the present disclosure.

The presently disclosed binder composition for a non-aqueous secondary battery positive electrode contains a first binder and can be used in production of a composition for a non-aqueous secondary battery positive electrode. The presently disclosed composition for a non-aqueous secondary battery positive electrode is a composition that contains the presently disclosed binder composition and further contains at least one of a second binder, a positive electrode active material, and a conductive material, and that is used as a material in production of a positive electrode mixed material layer of a positive electrode for a non-aqueous secondary battery. The presently disclosed composition for a non-aqueous secondary battery positive electrode can be produced, for example, by the presently disclosed method for producing a composition for a non-aqueous secondary battery positive electrode.

It should be noted that in the following description, a composition for a non-aqueous secondary battery positive electrode that contains the binder composition for a non-aqueous secondary battery positive electrode containing the first binder, and also contains a conductive material, but does not contain a positive electrode active material, is referred to as a "conductive material paste for a non-aqueous secondary battery positive electrode". Moreover, a composition for a non-aqueous secondary battery positive electrode that contains the binder composition for a non-aqueous secondary battery positive electrode containing the first binder, and also contains a positive electrode active material, but does not contain a conductive material, is referred to as an "active material paste for a non-aqueous secondary battery positive electrode". Furthermore, a composition for a non-aqueous secondary battery positive electrode that contains the binder composition for a non-aqueous secondary battery positive electrode containing the first binder, and also contains a positive electrode active material and a conductive material, is referred to as a "slurry composition for a non-aqueous secondary battery positive electrode". The conductive material paste for a non-aqueous secondary battery positive electrode, the active material paste for a non-aqueous secondary battery positive electrode, and the slurry composition for a non-aqueous secondary battery positive electrode may optionally contain a second binder.

The slurry composition for a non-aqueous secondary battery positive electrode can be used in formation of a positive electrode mixed material layer of the presently disclosed positive electrode for a non-aqueous secondary battery. The presently disclosed positive electrode for a non-aqueous secondary battery can be produced, for example, by the presently disclosed method for producing a positive electrode for a non-aqueous secondary battery.

Moreover, the presently disclosed non-aqueous secondary battery includes the presently disclosed positive electrode for a non-aqueous secondary battery formed using the slurry composition for a non-aqueous secondary battery positive electrode and can be produced, for example, by the presently disclosed method for producing a non-aqueous secondary battery.

(Binder Composition for Non-Aqueous Secondary Battery Positive Electrode)

The presently disclosed binder composition for a non-aqueous secondary battery positive electrode contains the first binder and a solvent. Moreover, a feature of the presently disclosed binder composition for a non-aqueous secondary battery positive electrode is that the binder composition also contains iron and at least one of ruthenium and rhodium, and has a total iron, ruthenium, and rhodium content of no greater than $5\times10^{-3}$ parts by mass per 100 parts by mass of the first binder. Note that besides the components described above, the presently disclosed binder composition for a non-aqueous secondary battery positive electrode may contain other components that can be contained positive electrodes of non-aqueous secondary batteries.

Through the presently disclosed binder composition for a non-aqueous secondary battery positive electrode, it is possible to form a positive electrode with which a non-aqueous secondary battery having excellent life characteristics can be obtained even when aging treatment is carried out under low-temperature and low-depth of charge conditions.

Although it is not clear why the presently disclosed binder composition for a non-aqueous secondary battery positive electrode enables formation of a positive electrode with which a non-aqueous secondary battery having excellent life characteristics can be obtained even when aging treatment is carried out under low-temperature and low-depth of charge conditions, the reason for this is presumed to be as follows. Specifically, since a positive electrode formed using the presently disclosed binder composition for a non-aqueous secondary battery positive electrode contains iron and at least one of ruthenium and rhodium, the iron and at least one of ruthenium and rhodium promote the formation of an SEI film at the surface of an electrode active material (negative electrode active material and/or positive electrode active material) in a non-aqueous secondary battery including this positive electrode. Accordingly, use of the presently disclosed binder composition for a non-aqueous secondary battery positive electrode enables favorable formation of an SEI film even when aging treatment is carried out under low-temperature and low-depth of charge conditions, and thus enables acquisition of a non-aqueous secondary battery having excellent life characteristics. If the total iron, ruthenium, and rhodium content is excessively high, an excessively thick SEI film may be formed, leading to an increase in internal resistance, and metal deposition may occur. However, in the presently disclosed binder composition for a non-aqueous secondary battery positive electrode, the total iron, ruthenium, and rhodium content is no greater than a specific proportion. Accordingly, when the presently disclosed binder composition for a non-aqueous secondary battery positive electrode is used, an SEI film of an appropriate thickness can be formed and a non-aqueous secondary battery having excellent life characteristics can be obtained. It is thought that iron promotes formation of an SEI film by also migrating toward a negative electrode in a non-aqueous secondary battery and promoting an electrochemical reaction at the interface between an electrolysis solution and a negative electrode active material and/or positive electrode active material. Moreover, it is thought that ruthenium and/or rhodium promotes formation of an SEI film and improves life characteristics, particularly in a high-potential region, by promoting decomposition of an additive for electrolysis solution such as fluoroethylene carbonate (particularly an additive that decomposes at high-potential and promotes formation of an SEI film). In a non-aqueous secondary battery in which the presently disclosed binder composition for a non-aqueous secondary battery positive electrode is used, formation of a good SEI film and improvement of non-aqueous secondary battery life characteristics can be achieved to high levels compared to a situation in which only iron or only ruthenium and/or rhodium is contained because the mechanism by which iron promotes SEI film formation and the mechanism by which ruthenium and/or rhodium promotes SEI film formation are different.

<First Binder>

The first binder contained in the presently disclosed binder composition for a non-aqueous secondary battery positive electrode is a component that, in a positive electrode produced by forming a positive electrode mixed material layer on a current collector using a slurry composition for a non-aqueous secondary battery positive electrode prepared using the binder composition, can hold components contained in the positive electrode mixed material layer such that these components do not become detached from the positive electrode mixed material layer. In general, when a binder in a positive electrode mixed material layer is immersed in an electrolysis solution, the binder swells due to absorption of the electrolysis solution while binding a positive electrode active material together, binding the positive electrode mixed material to a conductive material, and/or binding the conductive material together such as to prevent the positive electrode active material and the like from becoming detached from the current collector.

So long as the first binder is a polymer other than the fluorine-containing polymer described further below, the first binder may be any known polymer that is used as a binder for a non-aqueous secondary battery positive electrode. Specific examples of the first binder include a polymer including an alkylene structural unit and a nitrile group-containing monomer unit (for example, a hydrogenated polymer obtained through hydrogenation of a polymer including a conjugated diene monomer unit and a nitrile group-containing monomer unit); an acrylic-based polymer such as polybutyl acrylate, polybutyl methacrylate, polyhydroxyethyl methacrylate, polyacrylamide, polyacrylonitrile, butyl acrylate-styrene copolymer, butyl acrylate-acrylonitrile copolymer, or butyl acrylate-acrylonitrile-glycidyl methacrylate copolymer; a silicon-containing polymer such as dimethylpolysiloxane, diphenylpolysiloxane, or dihydroxypolysiloxane; an olefin-based polymer such as liquid polyethylene, polypropylene, poly(1-butene), ethylene-α-olefin copolymer, propylene-α-olefin copolymer, ethylene-propylene-diene copolymer (EPDM), or ethylene-propylene-styrene copolymer; a vinyl-based polymer such as polyvinyl alcohol, polyvinyl acetate, polyvinyl stearate, or vinyl acetate-styrene copolymer; an epoxy-based polymer such as polyethylene oxide, polypropylene oxide, or epichlorohydrin rubber; or another polymer such as natural rubber, a polypeptide, a protein, a polyester-based thermoplastic elastomer, a vinyl chloride-based thermoplastic elastomer, or a polyamide-based thermoplastic elastomer.

Of such polymers, the first binder is preferably a polymer that includes an alkylene structural unit and a nitrile group-containing monomer unit. Through use of a polymer including an alkylene structural unit and a nitrile group-containing monomer unit as the first binder, non-aqueous secondary battery life characteristics can be further improved.

[Polymer Including Alkylene Structural Unit and Nitrile Group-Containing Monomer Unit]

The polymer including an alkylene structural unit and a nitrile group-containing monomer unit includes the alkylene structural unit and the nitrile group-containing monomer unit as repeating units and may optionally include repeating units other than the alkylene structural unit and the nitrile group-containing monomer unit (hereinafter, also referred to as "other repeating units").

Although the polymer including the alkylene structural unit and the nitrile group-containing monomer unit may include a monomer unit that contains fluorine (fluorine-containing monomer unit), the polymer including the alkylene structural unit and the nitrile group-containing monomer unit is different from the fluorine-containing polymer described further below and includes the fluorine-containing monomer unit in a proportion of normally no greater than 30 mass %, and preferably no greater than 20 mass %.

—Alkylene Structural Unit—

The alkylene structural unit is a repeating unit composed only of an alkylene structure represented by a general formula —$C_nH_{2n}$— (n is an integer of at least 2). As a result of this alkylene structural unit being included in the polymer including the alkylene structural unit and the nitrile group-containing monomer unit, dispersibility of a conductive material can be improved when the polymer is used in production of a composition for a non-aqueous secondary battery positive electrode that includes the conductive material.

Although the alkylene structural unit may be linear or branched, the alkylene structural unit is preferably linear (i.e., is preferably a linear alkylene structural unit). The carbon number of the alkylene structural unit is preferably at least 4 (i.e., n in the above general formula is preferably an integer of at least 4).

No specific limitations are placed on the method by which the alkylene structural unit is introduced into the polymer. For example, method (1) or (2), set forth below, may be used.

(1) A method involving preparing a polymer from a monomer composition containing a conjugated diene monomer and hydrogenating the resultant polymer to convert the conjugated diene monomer unit to an alkylene structural unit (2) A method involving preparing a polymer from a monomer composition containing a 1-olefin monomer Of these methods, method (1) is preferable in terms of ease of production of the polymer.

Examples of conjugated diene monomers that can be used include conjugated diene compounds having a carbon number of at least 4 such as 1,3-butadiene, isoprene, 2,3-dimethyl-1,3-butadiene, 2-ethyl-1,3-butadiene, and 1,3-pentadiene. Of these compounds, 1,3-butadiene is preferable. In other words, the alkylene structural unit is preferably a structural unit obtained through hydrogenation of a conjugated diene monomer unit (i.e., a hydrogenated conjugated diene unit), and more preferably a structural unit obtained through hydrogenation of a 1,3-butadiene unit (i.e., a hydrogenated 1,3-butadiene unit).

Moreover, examples of 1-olefin monomers that can be used include ethylene, propylene, 1-butene, and 1-hexene.

One of such conjugated diene monomers or 1-olefin monomers may be used individually, or two or more of such conjugated diene monomers or 1-olefin monomers may be used in combination.

The proportion constituted by the alkylene structural unit in the polymer including the alkylene structural unit and the nitrile group-containing monomer unit is preferably at least 20 mass %, more preferably at least 25 mass %, even more preferably at least 30 mass %, and particularly preferably at least 55 mass %, and is preferably no greater than 90 mass %, more preferably no greater than 85 mass %, and even more preferably no greater than 80 mass %, where the total of all repeating units in the polymer (i.e., the total of structural units and monomer units) is taken to be 100 mass %. As a result of the alkylene structural unit being included in a proportion of at least 20 mass %, plasticity of the polymer can be increased and non-aqueous secondary battery life characteristics can be improved. Moreover, as a result of the alkylene structural unit being included in a proportion of no greater than 90 mass %, binding capacity of the polymer can be sufficiently increased.

In a situation in which the polymer including the alkylene structural unit and the nitrile group-containing monomer unit is a hydrogenated polymer obtained through hydrogenation of a polymer including a conjugated diene monomer unit and a nitrile group-containing monomer unit (i.e., in a situation in which the alkylene structural unit is a hydrogenated conjugated diene unit), the proportion constituted by the conjugated diene monomer unit in the polymer including the conjugated diene monomer unit and the nitrile group-containing monomer unit prior to hydrogenation is preferably at least 20 mass %, more preferably at least 25 mass %, even more preferably at least 30 mass %, and particularly preferably at least 55 mass %, and is preferably no greater than 90 mass %, more preferably no greater than 85 mass %, and even more preferably no greater than 80 mass %, where the total of all repeating units in the polymer is taken to be 100 mass %. As a result of the conjugated diene monomer unit being included in a proportion of at least 20 mass %, plasticity of the hydrogenated polymer obtained through hydrogenation of the polymer can be increased and non-aqueous secondary battery life characteristics can be improved. Moreover, as a result of the conjugated diene monomer unit being included in a proportion of no greater than 90 mass %, binding capacity of the hydrogenated polymer can be sufficiently increased.

—Nitrile Group-Containing Monomer Unit—

Examples of nitrile group-containing monomers that can be used to form the nitrile group-containing monomer unit include α,β-ethylenically unsaturated nitrile monomers. No specific limitations are placed on α,β-ethylenically unsaturated nitrile monomers that can be used other than being an α,β-ethylenically unsaturated compound that contains a nitrile group. Examples include acrylonitrile; α-halogenoacrylonitriles such as α-chloroacrylonitrile and α-bromoacrylonitrile; and α-alkylacrylonitriles such as methacrylonitrile and α-ethylacrylonitrile. Of these examples, acrylonitrile and methacrylonitrile are preferable, and acrylonitrile is more preferable as a nitrile group-containing monomer.

One of such nitrile group-containing monomers may be used individually, or two or more of such nitrile group-containing monomers may be used in combination.

The proportion constituted by the nitrile group-containing monomer unit in the polymer including the alkylene structural unit and the nitrile group-containing monomer unit is preferably at least 10 mass %, more preferably at least 20 mass %, and even more preferably at least 30 mass %, and is preferably no greater than 60 mass %, more preferably no greater than 50 mass %, even more preferably no greater than 48 mass %, and particularly preferably no greater than 45 mass %. As a result of the nitrile group-containing monomer unit being included in a proportion of at least 10 mass %, binding capacity of the polymer can be sufficiently increased. Moreover, as a result of the nitrile group-containing monomer unit being included in a proportion of no greater than 60 mass %, excessive swelling of the polymer in electrolysis solution can be inhibited and non-aqueous secondary battery life characteristics can be improved.

—Other Repeating Units—

Examples of monomers that can be used to form other repeating units (hereinafter, also referred to as "other monomers") include, but are not specifically limited to, (meth)acrylic acid ester monomers and polymerizable monomers containing a hydrophilic group. Of these other monomers, (meth)acrylic acid ester monomers are preferable. In other words, the polymer preferably includes a (meth)acrylic acid ester monomer unit.

One of such monomers may be used individually, or two or more of such monomers may be used in combination. In the present disclosure, "(meth)acryl" is used to indicate "acryl" and/or "methacryl".

Examples of (meth)acrylic acid ester monomers that can be used include alkyl acrylates such as methyl acrylate, ethyl acrylate, n-propyl acrylate, isopropyl acrylate, n-butyl acrylate, t-butyl acrylate, isobutyl acrylate, n-pentyl acrylate, isopentyl acrylate, hexyl acrylate, heptyl acrylate, octyl acrylate, 2-ethylhexyl acrylate, nonyl acrylate, decyl acrylate, lauryl acrylate, n-tetradecyl acrylate, and stearyl acrylate; and alkyl methacrylates such as methyl methacrylate, ethyl methacrylate, n-propyl methacrylate, isopropyl methacrylate, n-butyl methacrylate, t-butyl methacrylate, isobutyl methacrylate, n-pentyl methacrylate, isopentyl methacrylate, hexyl methacrylate, heptyl methacrylate, octyl methacrylate, 2-ethylhexyl methacrylate, nonyl methacrylate, decyl methacrylate, lauryl methacrylate, n-tetradecyl methacrylate, and stearyl methacrylate. Of these (meth)acrylic acid ester monomers, ethyl acrylate, n-butyl acrylate, and 2-ethylhexyl acrylate are preferable, and n-butyl acrylate is more preferable.

Examples of polymerizable monomers containing a hydrophilic group that can be used include carboxylic acid group-containing monomers, sulfonate group-containing monomers, phosphate group-containing monomers, and hydroxy group-containing monomers. From a viewpoint of increasing binding capacity of the polymer, the hydrophilic group is preferably a carboxylic acid group or a sulfonate group, and is more preferably a carboxylic acid group.

Examples of carboxylic acid group-containing monomers include monocarboxylic acids, derivatives of monocarboxylic acids, dicarboxylic acids, acid anhydrides of dicarboxylic acids, and derivatives of dicarboxylic acids.

Examples of monocarboxylic acids include acrylic acid, methacrylic acid, and crotonic acid.

Examples of derivatives of monocarboxylic acids include 2-ethylacrylic acid, isocrotonic acid, α-acetoxyacrylic acid, β-trans-aryloxyacrylic acid, α-chloro-β-E-methoxyacrylic acid, and β-diaminoacrylic acid.

Examples of dicarboxylic acids include maleic acid, fumaric acid, and itaconic acid.

Examples of derivatives of dicarboxylic acids include methyl maleic acid, dimethyl maleic acid, phenyl maleic acid, chloromaleic acid, dichloromaleic acid, fluoromaleic acid, and maleic acid esters such as methylallyl maleate, diphenyl maleate, nonyl maleate, decyl maleate, dodecyl maleate, octadecyl maleate, and fluoroalkyl maleate.

Examples of acid anhydrides of dicarboxylic acids include maleic anhydride, acrylic anhydride, methyl maleic anhydride, and dimethyl maleic anhydride.

Furthermore, an acid anhydride that produces a carboxyl group upon hydrolysis can also be used as a carboxylic acid group-containing monomer.

Other examples include monoesters and diesters of α,β-ethylenically unsaturated polyvalent carboxylic acids such as monoethyl maleate, diethyl maleate, monobutyl maleate, dibutyl maleate, monoethyl fumarate, diethyl fumarate, monobutyl fumarate, dibutyl fumarate, monocyclohexyl fumarate, dicyclohexyl fumarate, monoethyl itaconate, diethyl itaconate, monobutyl itaconate, and dibutyl itaconate.

Examples of sulfonate group-containing monomers include vinyl sulfonic acid, methyl vinyl sulfonic acid, (meth)allyl sulfonic acid, styrene sulfonic acid, (meth)acrylic acid-2-ethyl sulfonate, 2-acrylamido-2-methylpropane sulfonic acid, and 3-allyloxy-2-hydroxypropane sulfonic acid.

In the present disclosure, "(meth)allyl" is used to indicate "allyl" and/or "methallyl".

Examples of phosphate group-containing monomers include 2-(meth)acryloyloxyethyl phosphate, methyl-2-(meth)acryloyloxyethyl phosphate, and ethyl-(meth)acryloyloxyethyl phosphate.

In the present disclosure, "(meth)acryloyl" is used to indicate "acryloyl" and/or "methacryloyl".

Examples of hydroxy group-containing monomers include ethylenically unsaturated alcohols such as (meth) allyl alcohol, 3-butene-1-ol, and 5-hexene-1-ol; alkanol esters of ethylenically unsaturated carboxylic acids such as 2-hydroxyethyl acrylate, 2-hydroxypropyl acrylate, 2-hydroxyethyl methacrylate, 2-hydroxypropyl methacrylate, 2-hydroxyethyl maleate, 4-hydroxybutyl maleate, and di-2-hydroxypropyl itaconate; esters of (meth)acrylic acid and polyalkylene glycols represented by the general formula $CH_2=CR^1-COO-(C_nH_{2n}O)_m-H$ (where m represents an integer of 2 to 9, n represents an integer of 2 to 4, and $R^1$ represents hydrogen or a methyl group); mono(meth)acrylic acid esters of dihydroxy esters of dicarboxylic acids such as 2-hydroxyethyl-2'-(meth)acryloyloxy phthalate and 2-hydroxyethyl-2'-(meth)acryloyloxy succinate; vinyl ethers such as 2-hydroxyethyl vinyl ether and 2-hydroxypropyl vinyl ether; mono(meth)allyl ethers of alkylene glycols such as (meth)allyl-2-hydroxyethyl ether, (meth)allyl-2-hydroxypropyl ether, (meth)allyl-3-hydroxypropyl ether, (meth)allyl-2-hydroxybutyl ether, (meth)allyl-3-hydroxybutyl ether, (meth)allyl-4-hydroxybutyl ether, and (meth)allyl-6-hydroxyhexyl ether; mono(meth)allyl ethers of polyoxyalkylene glycols such as diethylene glycol mono(meth)allyl ether and dipropylene glycol mono(meth)allyl ether; mono(meth)allyl ethers of halogen or hydroxy substituted (poly)alkylene glycols such as glycerin mono(meth)allyl ether, (meth)allyl-2-chloro-3-hydroxypropyl ether, and (meth)allyl-2-hydroxy-3-chloropropyl ether; mono(meth)allyl ethers of polyhydric phenols such as eugenol and isoeugenol, and halogen substituted products thereof; and (meth)allyl thioethers of alkylene glycols such as (meth)allyl-2-hydroxyethyl thioether and (meth)allyl-2-hydroxypropyl thioether.

The proportion constituted by these other repeating units in the polymer including the alkylene structural unit and the nitrile group-containing monomer unit is preferably at least 10 mass %, and is preferably no greater than 45 mass %, and more preferably no greater than 40 mass %. As a result of these other repeating units being included in a proportion of at least 10 mass %, binding capacity of the polymer can be sufficiently increased. Moreover, as a result of these other repeating units being included in a proportion of no greater than 45 mass %, excessive swelling of the polymer in electrolysis solution can be inhibited while increasing plasticity of the polymer, and non-aqueous secondary battery life characteristics can be improved.

—Production Method of Polymer—

No specific limitations are placed on the method by which the above-described polymer is produced, and the method may, for example, be solution polymerization, suspension polymerization, bulk polymerization, or emulsion polymerization.

Moreover, the polymerization method may be addition polymerization such as ionic polymerization, radical polymerization, or living radical polymerization. A known polymerization initiator such as a redox polymerization initiator including an iron-based compound may be used as a polymerization initiator.

In a situation in which the polymer is produced by method (1) described above, the method of polymerization of the polymer that is subsequently hydrogenated is preferably radical polymerization using a redox polymerization initiator that includes an iron-based compound. The redox polymerization initiator may be, but is not specifically limited to, a combination of cumene hydroperoxide, ethylenediaminetetraacetic acid iron monosodium salt, sodium hydroxymethanesulfinate, and ethylenediaminetetraacetic acid tetrasodium salt (EDTA.4Na).

The hydrogenation can be carried out by a known hydrogenation method such as an oil-layer hydrogenation method or a water-layer hydrogenation method. The catalyst used in the hydrogenation may be any selective hydrogenation catalyst that is commonly known such as a palladium-based catalyst or a rhodium-based catalyst. Two or more of such catalysts may be used together.

The hydrogenation of the polymer may be carried out, for example, by a method described in JP 4509792 B. Specifically, the hydrogenation of the polymer may be carried out after a metathesis reaction of the polymer in the presence of a catalyst and a co-olefin.

The catalyst in the metathesis reaction may be a known ruthenium-based catalyst. Of such catalysts, Grubbs' catalysts such as bis(tricyclohexylphosphine)benzylidene ruthenium dichloride and 1,3-bis(2,4,6-trimethylphenyl)-2-(imidazolidinylidene)(dichlorophenylmethylene)(tricyclohexylphosphine)ruthenium are preferable as the catalyst in the metathesis reaction. The co-olefin may be an olefin having a carbon number of 2 to 16 such as ethylene, isobutane, or 1-hexane. The hydrogenation catalyst used in the hydrogenation carried out after the metathesis reaction may be a known homogeneous hydrogenation catalyst such as Wilkinson's catalyst ($(PPh_3)_3RhCl$).

—Polymer Properties—

The degree of swelling in electrolysis solution of the polymer including the alkylene structural unit and the nitrile group-containing monomer unit is preferably at least 200 mass % and no greater than 700 mass %, more preferably no greater than 600 mass %, and even more preferably no greater than 400 mass %. A degree of swelling of the polymer in electrolysis solution that is at least 200 mass % can ensure sufficient ion conductivity in a positive electrode mixed material layer of a positive electrode for a non-aqueous secondary battery that is formed using the composition for a non-aqueous secondary battery positive electrode, and enables formation of a good SEI film by facilitating migration of iron and the like in a secondary battery. Moreover, a degree of swelling of the polymer in electrolysis solution that is no greater than 700 mass % can, in a situation in which a positive electrode for a non-aqueous secondary battery is used that includes a positive electrode mixed material layer formed using the composition for a non-aqueous secondary battery positive electrode, inhibit excessive swelling of the polymer in electrolysis solution and breakdown of a conduction path of the positive electrode mixed material layer, and can lower through-resistance of the positive electrode.

The degree of swelling in electrolysis solution of the polymer referred to in the present disclosure can be measured by a measurement method described in the EXAMPLES section of the present specification. Methods for adjusting the degree of swelling in electrolysis solution of the polymer include, but are not specifically limited to, altering the types and amounts of monomers used in production of the polymer.

The iodine value of the polymer including the alkylene structural unit and the nitrile group-containing monomer unit is preferably at least 0.01 mg/100 mg, and more preferably at least 1 mg/100 mg, and is preferably no greater than 65 mg/100 mg, more preferably no greater than 60 mg/100 mg, even more preferably no greater than 40 mg/100 mg, and particularly preferably no greater than 10 mg/100 mg. A polymer iodine value of at least 0.01 mg/100 mg and no greater than 65 mg/100 mg enables improvement of non-aqueous secondary battery output characteristics. Moreover, a polymer iodine value of no greater than 65 mg/100 mg can suppress a decrease in non-aqueous secondary battery life characteristics in a high-potential region.

The amount of residual double bonds in the polymer including the alkylene structural unit and the nitrile group-containing monomer unit is preferably at least 0.5% and no greater than 30%. An amount of residual double bonds in the polymer that is at least 0.5% and no greater than 30% enables improvement of non-aqueous secondary battery output characteristics. Moreover, an amount of residual double bonds in the polymer that is no greater than 30% can suppress a decrease in non-aqueous secondary battery life characteristics in a high-potential region.

The amount of residual double bonds referred to in the present disclosure can be measured by proton nuclear magnetic resonance ($^1$H-NMR).

<Iron, Ruthenium, and Rhodium>

The presently disclosed binder composition for a non-aqueous secondary battery positive electrode is required to contain iron and at least one of ruthenium and rhodium. If a binder composition does not contain iron and/or does not contain ruthenium and rhodium, it is not possible to adequately form an SEI film when aging treatment is carried out under low-temperature and low-depth of charge conditions, and thus non-aqueous secondary battery life characteristics decrease.

The iron, ruthenium, and rhodium may each be present in the binder composition as a simple substance, as a compound, or as ions. In the present disclosure, iron, ruthenium, and rhodium are considered to not be contained in a situation in which the contents of iron, ruthenium, and rhodium in the binder composition are lower than the lower limit of quantification.

The total iron, ruthenium, and rhodium content per 100 parts by mass of the first binder in the presently disclosed binder composition for a non-aqueous secondary battery positive electrode is required to be no greater than $5 \times 10^{-3}$ parts by mass, and is preferably no greater than $3.1 \times 10^{-3}$ parts by mass, and more preferably no greater than $2 \times 10^{-3}$ parts by mass. If the total iron, ruthenium, and rhodium content per 100 parts by mass of the first binder is greater than $5 \times 10^{-3}$ parts by mass, the SEI film becomes excessively thick, which increases internal resistance, metal deposition may occur, and non-aqueous secondary battery life characteristics decrease. The total iron, ruthenium, and rhodium content per 100 parts by mass of the first binder is preferably at least $4 \times 10^{-4}$ parts by mass, and more preferably at least $1 \times 10^{-3}$ parts by mass. As a result of the total iron, ruthenium, and rhodium content being at least $4 \times 10^{-4}$ parts by mass per 100 parts by mass of the first binder, formation of an SEI film can be sufficiently promoted even when aging treatment is carried out under low-temperature and low-depth of charge conditions, and non-aqueous secondary battery life characteristics can be sufficiently improved.

The iron content, ruthenium content, and rhodium content in the binder composition can each be adjusted to an appropriate amount by, for example, adding iron, ruthenium, and rhodium to a raw material used in production of the binder composition, an intermediate product (for example, a pre-hydrogenation polymer), or the produced binder composition, or removing iron, ruthenium, and rhodium from an intermediate product (for example, a pre-hydrogenation polymer) or the produced binder composition. Examples of methods for removing iron, ruthenium, and rhodium from the intermediate product or produced binder composition include, but are not specifically limited to, a method using a magnetic filter and a method using an adsorbent such as activated carbon or an ion-exchange resin.

[Iron]

Iron contained in the binder composition may, for example, originate from a compound used as a polymerization initiator, catalyst, or the like in production of the polymer used as the first binder or from a container, pipe, or the like made of iron-containing metal used in production of the binder composition. Moreover, iron contained in the binder composition may be added to the binder composition as an iron-based compound such as an iron oxide, iron chloride, iron hydroxide, or iron complex-containing organic compound.

The iron content per 100 parts by mass of the first binder is preferably at least $4 \times 10^{-5}$ parts by mass, and more preferably at least $1.5 \times 10^{-4}$ parts by mass, and is preferably no greater than $4 \times 10^{-3}$ parts by mass, more preferably no greater than $3 \times 10^{-3}$ parts by mass, and even more preferably no greater than $2.9 \times 10^{-3}$ parts by mass. An iron content within any of the ranges set forth above enables formation of a good SEI film even when aging treatment is carried out under low-temperature and low-depth of charge conditions, and can further improve non-aqueous secondary battery life characteristics. If the iron content is excessively low, SEI film formation may be inadequate and it may not be possible to sufficiently improve non-aqueous secondary battery life characteristics. On the other hand, if the iron content is excessively high, the SEI film may be excessively thick, leading to an increase in internal resistance, and metal deposition may occur.

[Ruthenium and Rhodium]

Ruthenium and rhodium contained in the binder composition may, for example, originate from a compound or the like used as a catalyst or the like in production of the polymer used as the first binder. Moreover, ruthenium and rhodium contained in the binder composition may be added to the binder composition as, for example, a ruthenium-based compound such as an organic complex or organic salt of ruthenium or a rhodium-based compound such as an organic complex or organic salt of rhodium.

The total ruthenium and rhodium content per 100 parts by mass of the first binder is preferably at least $4 \times 10^{-5}$ parts by mass, and more preferably at least $1.5 \times 10^{-4}$ parts by mass, and is preferably no greater than $4 \times 10^{-3}$ parts by mass, and more preferably no greater than $3 \times 10^{-3}$ parts by mass. A total ruthenium and rhodium content within any of the ranges set forth above enables formation of a good SEI film even when aging treatment is carried out under low-temperature and low-depth of charge conditions and can further improve non-aqueous secondary battery life characteristics. If the ruthenium and rhodium content is excessively low, SEI film formation may be inadequate and it may not be possible to sufficiently improve non-aqueous secondary battery life characteristics. On the other hand, if the ruthenium and rhodium content is excessively high, the SEI film may be excessively thick, leading to an increase in internal resistance, and metal deposition may occur.

The total ruthenium and rhodium content as a proportion relative to the total iron, ruthenium, and rhodium content (={(ruthenium content+rhodium content)/(iron content+ruthenium content+rhodium content)}×100 mass %) is preferably at least 3 mass %, and more preferably at least 10 mass %, and is preferably no greater than 20 mass %. As a result of the total ruthenium and rhodium content as a proportion being within any of the ranges set forth above, the iron and the ruthenium and rhodium each favorably promote formation of an SEI film, which can further improve non-aqueous secondary battery life characteristics in both a normal potential region and a high-potential region.

<Other Components>

Other than the components set forth above, the presently disclosed binder composition may contain components such as a reinforcing material, a leveling agent, a viscosity modifier, and an additive for electrolysis solution. These other components are not specifically limited so long as they do not affect the battery reactions and may be selected from commonly known components such as those described in WO 2012/115096 A1. One of such components may be used individually, or two or more of such components may be used in combination in a freely selected ratio.

<Production of Binder Composition>

The presently disclosed binder composition can be produced by dissolving or dispersing the above-described components in a solvent such as an organic solvent. Specifically, the binder composition can be produced by mixing the above-described components and the solvent using a mixer such as a ball mill, a sand mill, a bead mill, a pigment disperser, a grinding machine, an ultrasonic disperser, a homogenizer, a planetary mixer, or a FILMIX.

In production of the binder composition, the iron, ruthenium, and rhodium contents may be adjusted using a magnetic filter, adsorbent, or the like after the above-described components have been dissolved or dispersed in a solvent such as an organic solvent. In a situation in which the polymer used as the first binder is produced in the form of an aqueous dispersion, the binder composition may be obtained by removing water prior to mixing the polymer with a solvent, or the binder composition may be obtained by removing water after mixing the aqueous dispersion with a solvent.

(Composition for Non-Aqueous Secondary Battery Positive Electrode)

The presently disclosed composition for a non-aqueous secondary battery positive electrode contains the binder composition containing the first binder, and also contains at least one of a positive electrode active material, a conductive material, and a second binder that includes a fluorine-containing polymer. In other words, the presently disclosed composition for a non-aqueous secondary battery positive electrode contains the first binder, iron, at least one of ruthenium and rhodium, and a solvent, also contains at least one of the second binder, the positive electrode active material, and the conductive material, and may optionally further contain other components. Since the presently disclosed composition for a non-aqueous secondary battery positive electrode contains the binder composition described above, a positive electrode formed using this composition enables formation of a good SEI film. Accordingly, through use of the presently disclosed composition for a non-aqueous secondary battery positive electrode, it is possible to form a positive electrode with which a non-aqueous secondary battery having excellent life characteristics can be obtained even when aging treatment is carried out under low-temperature and low-depth of charge conditions.

<Binder Composition>

The binder composition is the presently disclosed binder composition for a non-aqueous secondary battery positive electrode described above.

<Second Binder>

The second binder used in combination with the above-described binder composition is a component that, in a positive electrode produced by forming a positive electrode mixed material layer on a current collector using a slurry composition for a non-aqueous secondary battery positive electrode, can hold components contained in the positive electrode mixed material layer, in the same manner as the above-described first binder, such that these components do not become detached from the positive electrode mixed material layer.

The second binder includes a fluorine-containing polymer. Through inclusion of the fluorine-containing polymer in the second binder used in combination with the above-described binder composition, non-aqueous secondary battery life characteristics can be sufficiently improved. Moreover, through use of the second binder containing the fluorine-containing polymer in combination with the above-described binder composition, it is possible to form a positive electrode for a non-aqueous secondary battery that is flexible and is resistant to cracking upon bending.

[Fluorine-Containing Polymer]

The fluorine-containing polymer included in the second binder is a polymer that includes a fluorine-containing monomer unit. Specific examples of the fluorine-containing polymer include homopolymers and copolymers of one or more fluorine-containing monomers and copolymers of one or more fluorine-containing monomers with one or more monomers that do not contain fluorine (hereinafter, referred to as "non-fluorine-containing monomers").

The proportion constituted by a fluorine-containing monomer unit in the fluorine-containing polymer is normally at least 70 mass %, and preferably at least 80 mass %. The proportion constituted by a non-fluorine-containing monomer unit in the fluorine-containing polymer is normally no greater than 30 mass %, and preferably no greater than 20 mass %.

Examples of fluorine-containing monomers that can be used to form the fluorine-containing monomer unit include vinylidene fluoride, tetrafluoroethylene, hexafluoropropylene, trifluorovinyl chloride, vinyl fluoride, and perfluoroalkyl vinyl ethers. Of these fluorine-containing monomers, vinylidene fluoride is preferable.

A monomer that does not contain fluorine and that is copolymerizable with the fluorine-containing monomer may be used as a non-fluorine containing monomer that can form a non-fluorine containing monomer unit. Examples include 1-olefins such as ethylene, propylene, and 1-butene; aromatic vinyl compounds such as styrene, α-methylstyrene, p-t-butylstyrene, vinyltoluene, and chlorostyrene; unsaturated nitrile compounds such as (meth)acrylonitrile; (meth) acrylic acid ester compounds such as methyl (meth)acrylate, butyl (meth)acrylate, and 2-ethylhexyl (meth)acrylate; (meth)acrylamide compounds such as (meth)acrylamide, N-methylol (meth)acrylamide, and N-butoxymethyl (meth) acrylamide; carboxyl group-containing vinyl compounds such as (meth)acrylic acid, itaconic acid, fumaric acid, crotonic acid, and maleic acid; epoxy group-containing unsaturated compounds such as allyl glycidyl ether and glycidyl (meth)acrylate; amino group-containing unsaturated compounds such as dimethylaminoethyl (meth)acrylate and diethylaminoethyl (meth)acrylate; sulfonate group-containing unsaturated compounds such as styrene sulfonic acid, vinyl sulfonic acid, and (meth)allyl sulfonic acid; sulfate group-containing unsaturated compounds such as 3-allyloxy-2-hydroxypropanesulfuric acid; and phosphate group-containing unsaturated compounds such as (meth) acrylic acid-3-chloro-2-propyl phosphate and 3-allyloxy-2-hydroxypropanephosphoric acid.

The fluorine-containing polymer is preferably a polymer in which vinylidene fluoride is used as a fluorine-containing monomer or a polymer in which tetrafluoroethylene is used as a fluorine-containing monomer, and is more preferably a polymer in which vinylidene fluoride is used as a fluorine-containing monomer.

Specifically, the fluorine-containing polymer is preferably a homopolymer of vinylidene fluoride (polyvinylidene fluoride); a copolymer of vinylidene fluoride and hexafluoropropylene; a copolymer of vinylidene fluoride and a polar group-containing unsaturated compound such as a carboxyl group-containing vinyl compound, an epoxy group-containing unsaturated compound, an amino group-containing unsaturated compound, a sulfonate group-containing unsaturated compound, a sulfate group-containing unsaturated compound, or a phosphate group-containing unsaturated compound; or polytetrafluoroethylene, is more preferably polyvinylidene fluoride or a copolymer of vinylidene fluoride and a polar group-containing unsaturated compound, and is even more preferably a copolymer of vinylidene fluoride and a polar group-containing unsaturated compound. Through use of a fluorine-containing polymer that includes a vinylidene fluoride unit, excessive swelling of the second binder in electrolysis solution can be inhibited, and non-aqueous secondary battery output characteristics and life characteristics can be further improved. Moreover, through use of a fluorine-containing polymer that includes a polar group-containing unsaturated compound monomer unit, non-aqueous secondary battery life characteristics can be further improved. Furthermore, through use of a fluorine-containing polymer that includes a vinylidene fluoride unit, favorable solubility in a solvent can be obtained when an organic solvent such as N-methylpyrrolidone is used as the solvent.

The fluorine-containing polymer described above may be one type used individually, or two or more types used together.

No specific limitations are placed on the method by which the above-described fluorine-containing polymer is produced, and the method may, for example, be solution polymerization, suspension polymerization, bulk polymerization, or emulsion polymerization.

Moreover, the polymerization method may be addition polymerization such as ionic polymerization, radical polymerization, or living radical polymerization. Furthermore, a known polymerization initiator may be used as a polymerization initiator.

[[Fluorine-Containing Polymer Properties]]

The melt viscosity of the fluorine-containing polymer is preferably at least 1.0 kPa·s, more preferably at least 3.0 kPa·s, even more preferably at least 3.5 kPa·s, and particularly preferably at least 4.0 kPa·s, and is preferably no greater than 8.0 kPa·s, more preferably no greater than 7.0 kPa·s, and even more preferably no greater than 6.0 kPa·s. As a result of the melt viscosity of the fluorine-containing polymer being at least 1.0 kPa·s, the occurrence of positive electrode active material sedimentation and binder migration in formation of a positive electrode mixed material layer can be sufficiently inhibited, and non-aqueous secondary battery life characteristics can be further improved. Moreover, as a result of the melt viscosity of the fluorine-containing polymer being no greater than 8.0 kPa·s, an increase in viscosity of the composition for a non-aqueous secondary battery positive electrode can be suppressed, and thus reduction in handleability of the composition for a non-aqueous secondary battery positive electrode can be prevented.

[Content]

The content of the second binder in the composition for a non-aqueous secondary battery positive electrode as a proportion when the total content of the first binder and the second binder is taken to be 100 mass % is preferably at least 50 mass %, more preferably at least 60 mass %, and even more preferably at least 70 mass %, and is preferably no greater than 99.9 mass %, more preferably no greater than 95 mass %, and even more preferably no greater than 85 mass %. As a result of the content of the second binder as a proportion relative to the total content of the first binder and the second binder being at least 50 mass %, the occurrence of positive electrode active material sedimentation and binder migration in formation of a positive electrode mixed material layer can be sufficiently inhibited and non-aqueous secondary battery life characteristics can be further improved. Moreover, as a result of the content of the second binder as a proportion relative to the total content of the first binder and the second binder being no greater than 99.9 mass %, SEI film formation can be favorably promoted and non-aqueous secondary battery life characteristics can be further improved.

The total content of the first binder and the second binder in the composition for a non-aqueous secondary battery positive electrode relative to, for example, 100 parts by mass of the positive electrode active material described further below, is preferably at least 0.3 parts by mass, more preferably at least 0.5 parts by mass, and even more preferably at least 0.8 parts by mass, and is preferably no greater than 5 parts by mass, more preferably no greater than 3.5 parts by mass, even more preferably no greater than 3.3 parts by mass, and particularly preferably no greater than 2 parts by mass. By setting the total content of the first binder and the second binder as at least any of the lower limits set forth above, detachment of components such as the positive electrode active material from a positive electrode mixed material layer can be inhibited, and secondary battery life characteristics can be sufficiently improved through favorable formation of an SEI film. Moreover, by setting the total content of the first binder and the second binder as no greater than any of the upper limits set forth above, a rise in secondary battery internal resistance can be suppressed.

For the same reasons, the total content of the first binder and the second binder in the composition for a non-aqueous secondary battery positive electrode relative to, for example, 100 parts by mass of the conductive material described further below, is preferably at least 40 parts by mass, and more preferably at least 50 parts by mass, and is preferably no greater than 150 parts by mass, and more preferably no greater than 110 parts by mass.

<Positive Electrode Active Material>

The positive electrode active material is a material that accepts and donates electrons in the positive electrode of a secondary battery. In the case of a positive electrode active material for a lithium ion secondary battery, the positive electrode active material is normally a material that can occlude and release lithium.

Although the following describes the positive electrode active material using an example in which the non-aqueous secondary battery is a lithium ion secondary battery, the present disclosure is not limited to the following example.

Specific examples of the positive electrode active material for a lithium ion secondary battery include transition metal-containing compounds, such as a transition metal oxide, a transition metal sulfide, and a composite metal oxide comprising lithium and a transition metal. Examples of the transition metal include Ti, V, Cr, Mn, Fe, Co, Ni, Cu, and Mo.

Examples of the transition metal oxide include MnO, $MnO_2$, $V_2O_5$, $V_6O_{13}$, $TiO_2$, $Cu_2V_2O_3$, amorphous $V_2O$—$P_2O_5$, amorphous $MoO_3$, amorphous $V_2O_5$, and amorphous $V_6O_{13}$.

Examples of the transition metal sulfide include $TiS_2$, $TiS_3$, amorphous $MoS_2$, and FeS.

Examples of the composite metal oxide of lithium and a transition metal include a lithium-containing composite metal oxide with a layered structure, a lithium-containing composite metal oxide with a spinel structure, and a lithium-containing composite metal oxide with an olivine structure.

Examples of the lithium-containing composite metal oxide with a layered structure include lithium-containing cobalt oxide ($LiCoO_2$ (lithium cobalt oxide)), lithium-containing nickel oxide ($LiNiO_2$), lithium-containing composite oxide of Co—Ni—Mn (Li(Co Mn Ni)$O_2$), lithium-containing composite oxide of Ni—Mn—Al, lithium-containing composite oxide of Ni—Co—Al, and a solid solution comprising $LiMaO_2$ and $Li_2MbO_3$. Examples of the lithium-containing composite oxide of Co—Ni—Mn include $Li[Ni_{0.5}Co_{0.2}Mn_{0.3}]O_2$ and $Li[Ni_{1/3}Co_{1/3}Mn_{1/3}]O_2$. Examples of the solid solution comprising $LiMaO_2$ and $Li_2MbO_3$ include $xLiMaO_2 \cdot (1-x)Li_2MbO_3$ and the like, where x represents a number satisfying $0<x<1$, Ma represents one or more types of transition metals with an average oxidation state of 3+, and Mb represents one or more types of transition metals with an average oxidation state of 4+. Examples of solid solutions such as described above include $Li[Ni_{0.17}Li_{0.2}Co_{0.07}Mn_{0.56}]O_2$.

The term "average oxidation state" as used herein refers to an average oxidation state of the "one or more types of transition metals" and is calculated from the molar quantities and the valences of the transition metals. For example, in a situation in which the "one or more types of transition metals" is made up of 50 mol % of $Ni^{2+}$ and 50 mol % of $Mn^{4+}$, the average oxidation state of the "one or more types of transition metals" is $(0.5)\times(2+)+(0.5)\times(4+)=3+$.

Examples of the lithium-containing composite metal oxide with a spinel structure include lithium manganate ($LiMn_2O_4$) and compounds obtained by substituting part of Mn contained in lithium manganate ($LiMn_2O_4$) with another transition metal. One specific example thereof is $Li_s[Mn_{2-t}Mc_t]O_4$, such as $LiNi_{0.5}Mn_{1.5}O_4$, where Mc represents one or more types of transition metals having an average oxidation state of 4+, specific examples of which include Ni, Co, Fe, Cu, and Cr; t represents a number satisfying $0<t<1$; and s represents a number satisfying $0 \le s \le 1$. Another example of the positive electrode active material is lithium-rich spinel compounds represented by $Li_{1+x}Mn_{2-x}O_4$ ($0<x<2$).

Examples of the lithium-containing composite metal oxide with an olivine structure include olivine-type lithium phosphate compounds represented by the formula $Li_yM$-$dPO_4$, such as olivine-type lithium iron phosphate ($LiFePO_4$) and olivine-type manganese lithium phosphate ($LiMnPO_4$), where Md represents one or more types of transition metals having an average oxidation state of 3+, examples of which include Mn, Fe, and Co, and y represents a number satisfying $0 \le y \le 2$. Md of the olivine-type lithium phosphate compounds represented by the formula $Li_yM$-$dPO_4$ may be partly substituted with another metal. Examples of the metal possibly substituting the part of Md include Cu, Mg, Zn, V, Ca, Sr, Ba, Ti, Al, Si, B, and Mo.

Of these examples, lithium-containing cobalt oxide ($LiCoO_2$), lithium-containing composite oxide of Co—Ni—Mn (Li(Co Mn Ni)$O_2$), a solid solution comprising $LiMaO_2$ and $Li_2MbO_3$, $Li[Ni_{0.5}Co_{0.2}Mn_{0.3}]O_2$, $Li[Ni_{1/3}Co_{1/3}Mn_{1/3}]O_2$, and $LiNi_{0.5}Mn_{1.5}O_4$ are preferable as the positive electrode active material as this allows a higher lithium ion secondary battery potential.

<Conductive Material>

The conductive material ensures electrical contact within the positive electrode active material. Examples of conductive materials that can be used include conductive carbon materials such as carbon black (for example, acetylene black, Ketjen Black® (Ketjen black is registered trademark in Japan, other countries, or both), and furnace black), graphite, carbon fiber, carbon flakes, and carbon nanofiber (for example, carbon nanotubes and vapor-grown carbon fiber); and fibers and foils of various metals.

One of such conductive materials may be used individually, or two or more of such conductive materials may be used in combination.

The amount of the conductive material that is compounded per 100 parts by mass of the positive electrode active material is preferably at least 0.5 parts by mass, and more preferably at least 1.0 parts by mass, and is preferably no greater than 5.0 parts by mass, and more preferably no greater than 4.5 parts by mass. If the amount of the conductive material is excessively small, it may not be possible to ensure sufficient electrical contact within the positive electrode active material. On the other hand, if the amount of the conductive material is excessively large, there is a concern that viscosity stability of the composition for a non-aqueous secondary battery positive electrode may decrease and that the density of the positive electrode mixed material layer in the positive electrode may decrease such that it is not possible to provide the secondary battery with a sufficiently high capacity.

<Other Components>

Examples of other components that may be contained in the composition for a non-aqueous secondary battery positive electrode include, but are not specifically limited to, the same other components that may be contained in the presently disclosed binder composition. One of such other components may be used individually, or two or more of such other components may be used in combination in a freely selected ratio.

(Method for Producing Composition for Non-Aqueous Secondary Battery Positive Electrode)

The composition for a non-aqueous secondary battery positive electrode described above can be produced by dissolving or dispersing the above-described components in a solvent such as an organic solvent. For example, the composition for a non-aqueous secondary battery positive electrode can be produced by mixing the above-described components and the solvent using a mixer such as a ball mill, a sand mill, a bead mill, a pigment disperser, a grinding machine, an ultrasonic disperser, a homogenizer, a planetary mixer, or a FILMIX.

More specifically, a composition for a non-aqueous secondary battery positive electrode that, for example, contains at least the binder composition and the second binder can be produced through a step of mixing the binder composition and the second binder.

The following describes production methods for situations in which the composition for a non-aqueous secondary battery positive electrode containing the binder composition and the second binder is a conductive material paste for a non-aqueous secondary battery positive electrode, an active material paste for a non-aqueous secondary battery positive electrode, or a slurry composition for a non-aqueous secondary battery positive electrode.

<Method for Producing Conductive Material Paste for Non-Aqueous Secondary Battery Positive Electrode>

In a situation in which the composition for a non-aqueous secondary battery positive electrode is a conductive material paste for a non-aqueous secondary battery positive electrode, the conductive material paste can be produced by mixing the above-described binder composition, the above-described second binder, a conductive material, other optional components, and a solvent. No specific limitations are placed on the order in which the components are mixed in production of the conductive material paste for a non-aqueous secondary battery positive electrode. However, it is preferable that the conductive material is mixed with either the binder composition or the second binder prior to mixing of the remaining components or that all the components are mixed at the same time.

<Method for Producing Active Material Paste for Non-Aqueous Secondary Battery Positive Electrode>

In a situation in which the composition for a non-aqueous secondary battery positive electrode is an active material paste for a non-aqueous secondary battery positive electrode, the active material paste can be produced by mixing the above-described binder composition, the above-described second binder, a positive electrode active material, other optional components, and a solvent. No specific limitations are placed on the order in which the components are mixed in production of the active material paste for a non-aqueous secondary battery positive electrode. However, it is preferable that the positive electrode active material is mixed with either the binder composition or the second binder prior to mixing of the remaining components or that all the components are mixed at the same time.

<Method for Producing Slurry Composition for Non-Aqueous Secondary Battery Positive Electrode>

In a situation in which the composition for a non-aqueous secondary battery positive electrode is a slurry composition for a non-aqueous secondary battery positive electrode, the slurry composition can be produced by mixing the above-described binder composition, the above-described second binder, a positive electrode active material, a conductive material, other optional components, and a solvent. No specific limitations are placed on the order in which the components are mixed in production of the slurry composition for a non-aqueous secondary battery positive electrode. For example, a conductive material paste for a non-aqueous secondary battery positive electrode may be produced as described above and then mixed with a positive electrode active material, an active material paste for a non-aqueous secondary battery positive electrode may be produced as described above and then mixed with a conductive material, or all the components may be mixed at the same time.

(Positive Electrode for Non-Aqueous Secondary Battery)

The presently disclosed positive electrode for a non-aqueous secondary battery includes, for example, a current collector and a positive electrode mixed material layer formed on the current collector. The positive electrode mixed material layer is formed using the slurry composition for a non-aqueous secondary battery positive electrode (presently disclosed composition for a non-aqueous secondary battery positive electrode that contains a positive electrode active material and a conductive material). In other words, the positive electrode mixed material layer contains at least the positive electrode active material, the conductive material, the first binder, iron, and at least one of ruthenium and rhodium. In addition, the positive electrode mixed material layer optionally contains the second binder and other components. It should be noted that components contained in the positive electrode mixed material layer are components that are contained in the previously described slurry composition for a non-aqueous secondary battery positive electrode. Furthermore, the preferred ratio of these components in the positive electrode mixed material layer is the same as the preferred ratio of these components in the slurry composition.

Since the presently disclosed positive electrode for a non-aqueous secondary battery is produced using a slurry composition containing the presently disclosed binder composition for a non-aqueous secondary battery positive electrode, the positive electrode can be used to obtain a non-aqueous secondary battery having excellent life characteristics even when aging treatment is carried out under low-temperature and low-depth of charge conditions.

<Method for Producing Positive Electrode for Non-Aqueous Secondary Battery>

The presently disclosed positive electrode for a non-aqueous secondary battery is produced, for example, through a step of applying the above-described slurry composition for a non-aqueous secondary battery positive electrode onto a current collector (application step) and a step of drying the slurry composition applied onto the current collector to form a positive electrode mixed material layer on the current collector (drying step).

The presently disclosed positive electrode for a non-aqueous secondary battery can also be produced by a method in which composite particles are prepared through dry granulation of the above-described slurry composition for a non-aqueous secondary battery positive electrode and are used to form a positive electrode mixed material layer on a current collector.

[Application Step]

The above-described slurry composition for a non-aqueous secondary battery positive electrode may be applied onto the current collector by a commonly known method without any specific limitations. Specific examples of application methods that can be used include doctor blading, dip coating, reverse roll coating, direct roll coating, gravure coating, extrusion coating, and brush coating. The slurry composition for a non-aqueous secondary battery positive electrode may be applied onto one side or both sides of the current collector. The thickness of the slurry coating on the current collector after application but before drying may be appropriately set in accordance with the thickness of the positive electrode mixed material layer to be obtained after drying.

The current collector onto which the slurry composition for a non-aqueous secondary battery positive electrode is applied is a material having electrical conductivity and electrochemical durability. Specifically, the current collector may be made of, for example, iron, copper, aluminum, nickel, stainless steel, titanium, tantalum, gold, or platinum. Of these materials, aluminum foil is particularly preferable as a current collector used for a positive electrode. One of such materials may be used individually, or two or more of such materials may be used in combination in a freely selected ratio.

[Drying Step]

Any commonly known method may be used to dry the slurry composition for a non-aqueous secondary battery positive electrode on the current collector without any specific limitations. Examples of drying methods that can be used include drying by warm, hot, or low-humidity air; drying in a vacuum; and drying by irradiation with infrared light, electron beams, or the like. Through drying of the slurry composition for a non-aqueous secondary battery positive electrode on the current collector as described above, a positive electrode mixed material layer is formed on the current collector, thereby providing a positive electrode for a non-aqueous secondary battery that includes the current collector and the positive electrode mixed material layer.

The drying step preferably includes an operation of drying the slurry composition for a non-aqueous secondary battery positive electrode on the current collector at a temperature of at least 120° C. The slurry composition for a non-aqueous secondary battery positive electrode is more preferably dried at a temperature of at least 120° C. from the start of the drying step. Rapid drying of the slurry composition for a non-aqueous secondary battery positive electrode at a temperature of at least 120° C. enables efficient production of the positive electrode for a non-aqueous secondary battery. Although the drying temperature does not have a specific upper limit, the drying temperature is normally no higher than 180° C.

In general, binder migration and the like tend to occur when a slurry composition for a non-aqueous secondary battery positive electrode is dried at high-temperature. However, as a result of the above-described slurry composition for a non-aqueous secondary battery positive electrode being used in the presently disclosed method for producing a positive electrode for a non-aqueous secondary battery, migration and the like are inhibited, especially in a situation in which the second binder including the fluorine-containing polymer is used, and it is possible to efficiently produce a positive electrode for a non-aqueous secondary battery with which a non-aqueous secondary battery having sufficiently good life characteristics can be obtained even when aging treatment is carried out under low-temperature and low-depth of charge conditions.

In the presently disclosed method for producing a positive electrode for a non-aqueous secondary battery, the drying step may be followed by pressing treatment of the positive electrode mixed material layer by mold pressing, roll pressing, or the like. The pressing treatment can improve the close adherence between the positive electrode mixed material layer and the current collector.

Furthermore, when the positive electrode mixed material layer includes a curable polymer, the polymer is preferably cured after forming the positive electrode mixed material layer.

(Non-Aqueous Secondary Battery)

The presently disclosed non-aqueous secondary battery includes a positive electrode, a negative electrode, an electrolysis solution, and a separator. The positive electrode is the presently disclosed positive electrode for a non-aqueous secondary battery. Since the presently disclosed non-aqueous secondary battery includes the presently disclosed positive electrode for a non-aqueous secondary battery, the presently disclosed non-aqueous secondary battery can display excellent life characteristics even when aging treatment in production thereof is carried out under low-temperature and low-depth of charge conditions.

Although the following describes an example in which the non-aqueous secondary battery is a lithium ion secondary battery, the present disclosure is not limited to the following example.

<Negative Electrode>

The negative electrode may be a known negative electrode. Specifically, the negative electrode may for example be a negative electrode formed by a thin sheet of lithium metal or a negative electrode obtained by forming a negative electrode mixed material layer on a current collector.

The current collector may be made of metal material such as iron, copper, aluminum, nickel, stainless steel, titanium, tantalum, gold, or platinum. The negative electrode mixed material layer may include a negative electrode active material and a binder. The binder is not specifically limited and may be freely selected from known materials.

<Electrolysis Solution>

The electrolysis solution is normally an organic electrolysis solution obtained by dissolving a supporting electrolyte in an organic solvent. The supporting electrolyte may, for example, be a lithium salt. Examples of lithium salts that can be used include $LiPF_6$, $LiAsF_6$, $LiBF_4$, $LiSbF_6$, $LiAlCl_4$, $LiClO_4$, $CF_3SO_3Li$, $C_4F_9SO_3Li$, $CF_3COOLi$, $(CF_3CO)_2NLi$, $(CF_3SO_2)_2NLi$, and $(C_2F_5SO_2)_2NLi$. Of these lithium salts, $LiPF_6$, $LiClO_4$, and $CF_3SO_3Li$ are preferable in that they easily dissolve in solvent and exhibit a high degree of dissociation, with $LiPF_6$ being particularly preferable. One electrolyte may be used individually, or two or more electrolytes may be used in combination in a freely selected ratio. In general, lithium ion conductivity tends to increase when a supporting electrolyte having a high degree of dissociation is used. Therefore, lithium ion conductivity can be adjusted through the type of supporting electrolyte that is used.

The organic solvent used in the electrolysis solution is not specifically limited so long as the supporting electrolyte can dissolve therein. Examples of suitable organic solvents include carbonates such as dimethyl carbonate (DMC), ethylene carbonate (EC), diethyl carbonate (DEC), propylene carbonate (PC), butylene carbonate (BC), and ethyl methyl carbonate (EMC); esters such as γ-butyrolactone and methyl formate; ethers such as 1,2-dimethoxyethane and tetrahydrofuran; and sulfur-containing compounds such as sulfolane and dimethyl sulfoxide. Furthermore, a mixed liquid of such solvents may be used. Of these solvents, carbonates are preferable for their high dielectric constant and broad stable potential region, and a mixture of ethylene carbonate and ethyl methyl carbonate is more preferable.

The concentration of the electrolyte in the electrolysis solution can be adjusted as appropriate and is, for example, preferably from 0.5 mass % to 15 mass %, more preferably from 2 mass % to 13 mass %, and even more preferably from 5 mass % to 10 mass %.

It is preferable that a known additive such as fluoroethylene carbonate or ethyl methyl sulfone is added to the electrolysis solution, and more preferable that an additive such as fluoroethylene carbonate that decomposes at high-potential and promotes formation of an SEI film is added to the electrolysis solution. In a situation in which an additive such as fluoroethylene carbonate is contained in the electrolysis solution of the presently disclosed non-aqueous secondary battery, ruthenium and/or rhodium promotes decomposition of the additive, and thereby promotes formation of an SEI film, which enables improvement of life characteristics, particularly in a high-potential region.

<Separator>

The separator is not specifically limited and examples thereof include separators described in JP 2012-204303 A. Of these separators, fine porous membranes made of polyolefinic (i.e., polyethylene, polypropylene, polybutene, and polyvinyl chloride) resin are preferable for their ability to reduce total separator thickness thus increasing the ratio of the electrode active material in the secondary battery and consequently increasing the capacity per volume.

(Method for Producing Non-Aqueous Secondary Battery)

The presently disclosed non-aqueous secondary battery can be produced, for example, through a step of assembling a non-aqueous secondary battery including the presently disclosed positive electrode for a non-aqueous secondary battery, a negative electrode, an electrolysis solution, and a separator (assembly step), and a step of subjecting the non-aqueous secondary battery that has been assembled to aging treatment (aging step).

<Assembly Step>

A non-aqueous secondary battery may be assembled in the assembly step by, for example, stacking the above-described positive electrode and a negative electrode with a separator provided therebetween, performing rolling, folding, or the like of the resultant laminate as necessary in accordance with the battery shape to place the laminate in a battery container, filling the battery container with an electrolysis solution, and sealing the battery container. In order to prevent pressure-increase inside the non-aqueous secondary battery and occurrence of overcharging or overdischarging, an overcurrent preventing device such as a fuse or a PTC device; an expanded metal; or a lead plate may be provided as necessary. The shape of the non-aqueous secondary battery that is assembled may be a coin type, button type, sheet type, cylinder type, prismatic type, flat type, or the like.

<Aging Step>

In the aging step, the non-aqueous secondary battery is charged to a specific depth of charge and is stored at a specific temperature for a specific time (for example, from 6 hours to 14 hours, and preferably from 7 hours to 10 hours) to form an SEI film on an electrode active material (positive electrode active material and/or negative electrode active material). From a viewpoint of lowering the cost and shortening the time required for aging treatment, and raising non-aqueous secondary battery production efficiency, the depth of charge is preferably no greater than 13%, and more preferably no greater than 10%. For the same reason, the temperature is preferably no higher than 55° C., and more preferably no higher than 45° C. The temperature may be at least 30° C., and is preferably at least 35° C. Since the presently disclosed positive electrode for a non-aqueous secondary battery is used in the presently disclosed method for producing a non-aqueous secondary battery, it is possible to produce a non-aqueous secondary battery having excellent life characteristics even when the aging treatment is carried out under low-temperature and low-depth of charge conditions as described above.

EXAMPLES

The following provides a more specific description of the present disclosure based on examples. However, the present disclosure is not limited to the following examples. In the following, "%" and "parts" used to express quantities are by mass, unless otherwise specified.

In the examples and comparative examples, the following methods were used to evaluate the iodine value and degree of swelling in electrolysis solution of a hydrogenated polymer, the iron, ruthenium, and rhodium contents of a binder composition, the melt viscosity of a fluorine-containing polymer, the through-resistance of a positive electrode, and the life characteristics and high-potential life characteristics of a secondary battery.

<Iodine Value>

Coagulation of 100 g of an N-methylpyrrolidone (NMP) solution of a hydrogenated polymer was carried out in 1 L of methanol and then vacuum drying was performed overnight at a temperature of 60° C. The iodine value of the dried hydrogenated polymer was then measured in accordance with JIS K6235 (2006).

<Degree of Swelling in Electrolysis Solution>

An NMP solution of a hydrogenated polymer was cast on a sheet made of polytetrafluoroethylene and was dried to obtain a cast film. A 4 cm$^2$ specimen was cut from the obtained cast film and the weight thereof (pre-immersion weight: A) was measured. Thereafter, the specimen was immersed in an electrolysis solution at a temperature of 60° C. The immersed specimen was pulled out after 72 hours and a paper towel was used to wipe attached electrolysis solution from the specimen. The weight of the specimen (post-immersion weight: B) was measured soon after. The degree of swelling in electrolysis solution of the hydrogenated polymer was calculated according to the following formula. The electrolysis solution was a solution in which $LiPF_6$ was dissolved with a concentration of 1 mol/L in a mixed solvent obtained by mixing ethylene carbonate (EC) and ethyl methyl carbonate (EMC) (EC:EMC=3:7 (volume ratio at 20° C.)).

Degree of swelling in electrolysis solution(mass %)= $(B/A) \times 100$

<Iron, Ruthenium, and Rhodium Contents>

Approximately 1 g of a binder composition, in terms of solid content, was sampled and this sample was dissolved in approximately 5 mL of concentrated sulfuric acid. Thereafter, approximately 2 mL of concentrated nitric acid was gradually added to cause wet decomposition. After the decomposition, the acid was concentrated and was then made up to a fixed volume of 10 mL using ultrapure water. ICP-AES was then used to measure the amounts of iron ions, ruthenium ions, and rhodium ions. The iron, ruthenium, and rhodium contents in the binder composition were then calculated from the measured values.

<Melt Viscosity>

The melt viscosity of a fluorine-containing polymer was measured in accordance with ASTM D3835 at a temperature of 232° C. and a shear rate of 100 s$^{-1}$.

<Through-Resistance>

A produced positive electrode was immersed in an electrolysis solution at a temperature of 60° C. The immersed positive electrode was removed after 12 hours, was appropriately washed with diethyl carbonate (DEC), and was then gently wiped with a paper towel. The electrolysis solution was a solution in which $LiPF_6$ was dissolved with a concentration of 1 mol/L in a mixed solvent obtained by mixing ethylene carbonate (EC) and ethyl methyl carbonate (EMC) (EC:EMC=3:7 (volume ratio at 20° C.)).

Thereafter, the positive electrode was clamped by a gold-plated jig and was compressed at a pressure of 10 MPa. The voltage during passing of a 10 mA current was measured using terminals attached to the gold-plated jig and a multi-potentiostat. A voltage reading was made after 10 minutes and the volume resistivity ρ (Ω·cm) was calculated from a calculated resistance value, the positive electrode thickness, and the positive electrode area. The volume resistivity ρ was evaluated according to the following standard. A smaller volume resistivity ρ indicates lower through-resistance.

A: Volume resistivity ρ of less than 90 Ω·cm

B: Volume resistivity ρ of at least 90 Ω·cm and less than 180 Ω·cm

C: Volume resistivity ρ of at least 180 Ω·cm and less than 270 Ω·cm

D: Volume resistivity ρ of at least 270 Ω·cm

<Life Characteristics 1>

A produced secondary battery was subjected to 3 cycles of an operation in which the secondary battery was charged to 4.2 V and discharged to 3.0 V at 0.2 C in a 25° C. environment. Thereafter, the secondary battery was subjected to 100 cycles of an operation in which the secondary battery was charged to a battery voltage of 4.2 V at 1 C and discharged to a battery voltage of 3.0 V at 1 C in a 45° C. environment. A ratio of the discharge capacity of the $100^{th}$ cycle relative to the discharge capacity of the $1^{st}$ cycle was determined and was evaluated according to the following standard. A larger discharge capacity ratio indicates better life characteristics.

A: Ratio of at least 80%
B: Ratio of at least 77% and less than 80%
C: Ratio of at least 74% and less than 77%
D: Ratio of at least 70% and less than 74%
E: Ratio of less than 70%

<Life Characteristics 2>

The same operation as for "life characteristics 1" was carried out. A ratio of the discharge capacity of the $100^{th}$ cycle relative to the discharge capacity of the $1^{st}$ cycle was determined and was evaluated according to the following standard. A larger discharge capacity ratio indicates better life characteristics.

A+: Ratio of at least 84%
A: Ratio of at least 82% and less than 84%
A−: Ratio of at least 80% and less than 82%
B: Ratio of at least 77% and less than 80%
C: Ratio of at least 74% and less than 77%
D: Ratio of less than 74%

<High-Potential Life Characteristics 1>

A produced secondary battery was subjected to 3 cycles of an operation in which the secondary battery was charged to 4.4 V and discharged to 3.0 V at 0.2 C in a 25° C. environment. Thereafter, the secondary battery was subjected to 100 cycles of an operation in which the secondary battery was charged to a battery voltage of 4.4 V at 1 C and discharged to a battery voltage of 3.0 V at 1 C in a 45° C. environment. A ratio of the discharge capacity of the $100^{th}$ cycle relative to the discharge capacity of the $1^{st}$ cycle was determined and was evaluated according to the following standard. A larger discharge capacity ratio indicates better high-potential life characteristics.

A: Ratio of at least 77%
B: Ratio of at least 74% and less than 77%
C: Ratio of at least 70% and less than 74%
D: Ratio of at least 67% and less than 70%
E: Ratio of less than 67%

<High-Potential Life Characteristics 2>

The same operation as for "high-potential life characteristics 1" was carried out. A ratio of the discharge capacity of the $100^{th}$ cycle relative to the discharge capacity of the $1^{st}$ cycle was determined and was evaluated according to the following standard. A larger discharge capacity ratio indicates better high-potential life characteristics.

A+: Ratio of at least 80%
A: Ratio of at least 78% and less than 80%
A−: Ratio of at least 76% and less than 78%
B: Ratio of at least 74% and less than 76%
C: Ratio of at least 70% and less than 74%

The following separately considers a situation in which a second binder including a fluorine-containing polymer is not used (Experiment 1) and a situation in which a second binder including a fluorine-containing polymer is used (Experiment 2).

Experiment 1

Example 1-1

[Production of Hydrogenated Polymer]
—Polymer Production—

A solution of 0.2 parts of sodium carbonate dissolved in 200 parts of deionized water was prepared in a metal bottle. Next, 2.5 parts of potassium caprate (soap of a fatty acid having a carbon number of 10) was added to the metal bottle as an emulsifier. An aqueous solution containing 1.0 parts of a naphthalenesulfonic acid-formaldehyde polycondensate was further added as a dispersant. Thereafter, 35 parts of acrylonitrile as a nitrile group-containing monomer and 0.5 parts of t-dodecyl mercaptan as a molecular weight modifier were added to the metal bottle in this order. Gas inside the metal bottle was purged three times with nitrogen and then 65 parts of 1,3-butadiene was added as a conjugated diene monomer. The metal bottle was maintained at 5° C. while adding a redox polymerization initiator that was a combination of 0.1 parts of cumene hydroperoxide, 0.01 parts of ethylenediaminetetraacetic acid iron monosodium salt hydrate, 0.03 parts of sodium hydroxymethanesulfinate dihydrate, and 0.02 parts of EDTA.4Na.4H$_2$O. The temperature was then maintained at 5° C. for 16 hours while carrying out a polymerization reaction. Once the degree of polymerization reached 90%, the polymerization reaction was terminated through addition of 0.1 parts of hydroxylamine sulfate and 0.03 parts of diethylhydroxylamine as polymerization inhibitors. Residual monomers were removed using a rotary evaporator with a water temperature of 60° C. to yield a latex of a polymer (nitrile rubber) including a conjugated diene monomer unit and a nitrile group-containing monomer unit. The composition of the nitrile rubber was 35 mass % acrylonitrile monomer units and 65 mass % 1,3-butadiene monomer units, and had a latex concentration of 25 mass %.

A portion of the obtained latex was added to magnesium sulfate aqueous solution of an amount of 12 mass % relative to nitrile rubber content and was stirred therewith to coagulate the latex. Thereafter, filtration was performed with washing using water to obtain a coagulated material that was then vacuum dried for 12 hours at a temperature of 60° C. to yield a nitrile rubber as a polymer.

—Polymer Metathesis—

Next, 9 parts of the obtained polymer was dissolved in 141 parts of monochlorobenzene and was supplied into a reaction vessel. The reaction vessel was heated to 80° C. and then 2 L of a monochlorobenzene solution containing bis(tricyclohexylphosphine)benzylidene ruthenium dichloride as a Grubbs' catalyst was added thereto such that the amount of the Grubbs' catalyst was 0.25 parts relative to 100 parts of the polymer. The internal pressure of the reaction vessel was raised to 3.5 MPa with ethylene as a co-olefin and a metathesis reaction of the polymer was carried out at a stirring rate of 600 rpm. During the reaction, a constant temperature was maintained using a cooling coil connected to a temperature controller and a heat sensor.

—Polymer Hydrogenation—

Next, the inside of the reaction vessel was degassed three times with 0.7 MPa H$_2$ while continuing stirring. The temperature of the reaction vessel was then raised to 130° C. and 1 L of a monochlorobenzene solution containing Wilkinson's catalyst and triphenylphosphine was added to the reaction vessel. The amount of Wilkinson's catalyst was 0.075 parts per 100 parts of the polymer and the amount of triphenylphosphine was 1 part per 100 parts of the polymer.

The temperature was then raised to 138° C. and a hydrogenation reaction of the polymer was carried out under a hydrogen pressure (gauge pressure) of 8.4 MPa. The reaction was terminated at an end point at which the iodine value was 1.3 mg/100 mg. After the reaction had ended, the reaction vessel was charged with 0.2 parts of activated carbon having an average diameter of 15 μm and was stirred for 30 minutes. Thereafter, filtration was carried out using a filter having a pore diameter of 5 μm. Water vapor was introduced into the filtrate and monochlorobenzene was removed and recovered through water vapor distillation. Precipitated polymer (hydrogenated polymer) was recovered by separation and drying.

[Production of Binder Composition for Positive Electrode]

A sample of 64 parts of an aqueous dispersion of the obtained hydrogenated polymer, in terms of solid content, was added to 800 parts of N-methylpyrrolidone (NMP) as a solvent. Water was then evaporated under reduced pressure to yield a binder composition (NMP solution) containing the hydrogenated polymer as a binder. The iodine value and degree of swelling in electrolysis solution of the hydrogenated polymer were measured. Moreover, the iron, ruthenium, and rhodium contents of the obtained binder composition were measured. The results are shown in Table 1.

[Production of Slurry Composition for Positive Electrode]

A planetary mixer was charged with 100 parts of lithium cobalt oxide ($LiCoO_2$; volume-average particle diameter: 20 μm) as a positive electrode active material, 2.0 parts of acetylene black (volume-average particle diameter: 48 nm) as a conductive material, the binder composition in an amount such that 2.0 parts of the hydrogenated polymer, in terms of solid content, was present, and an appropriate amount of NMP as a solvent. Stirring was performed for 60 minutes with a solid content concentration such that shear during thick-kneading was 680 W/kg. At this time, the solid content concentration was 78 mass %. Thereafter, further NMP was added and further kneading was performed using the planetary mixer such that the viscosity at a shear rate of 20 $s^{-1}$ was approximately 4,000 mPa·s to yield a slurry composition for a positive electrode.

[Production of Positive Electrode for Secondary Battery]

Aluminum foil of 15 μm in thickness was prepared as a current collector. The obtained slurry composition for a positive electrode was applied onto both sides of the aluminum foil such as to have an application amount after drying of 20 mg/$cm^2$. The slurry composition for a positive electrode was dried for 20 minutes at 60° C. and for 20 minutes at 120° C., and was then heat treated for 2 hours at 120° C. to obtain a positive electrode web. The obtained positive electrode web was rolled by roll pressing to produce a sheet-shaped positive electrode including the aluminum foil (current collector) and a positive electrode mixed material layer having a density of 3.7 g/$cm^3$. The sheet-shaped positive electrode was cut to 4.8 cm in width and 50 cm in length for use as a positive electrode.

The through-resistance of the positive electrode was evaluated. The results are shown in Table 1.

[Production of Negative Electrode for Secondary Battery]

A slurry composition for a negative electrode was produced by using a planetary mixer to mix 90 parts of spherical artificial graphite (volume-average particle diameter: 12 μm) and 10 parts of $SiO_x$ (volume-average particle diameter: 10 μm) as negative electrode active materials, 1 part of a styrene-butadiene polymer (volume-average particle diameter: 180 nm; glass transition temperature: −40° C.) as a binder, 1 part of carboxymethyl cellulose as a thickener, and an appropriate amount of water.

Next, copper foil with a thickness of 15 μm was prepared as a current collector. The slurry composition for a negative electrode was applied onto both sides of the copper foil such as to have an application amount after drying of 12 mg/$cm^2$. The slurry composition for a negative electrode was dried for 20 minutes at 50° C. and for 20 minutes at 110° C., and was then heat treated for 2 hours at 150° C. to obtain a negative electrode web. The obtained negative electrode web was rolled by roll pressing to produce a sheet-shaped negative electrode including the copper foil (current collector) and a negative electrode mixed material layer having a density of 1.8 g/$cm^3$. The sheet-shaped negative electrode was cut to 5.0 cm in width and 52 cm in length for use as a negative electrode.

[Production of Secondary Battery]

The obtained positive and negative electrodes where wound up in a state with a separator therebetween using a core of 20 mm in diameter to obtain a wound body. A fine porous membrane made of polypropylene and having a thickness of 20 μm was used as the separator. The resulting wound body was compressed in one direction at a rate of 10 mm/s until reaching a thickness of 4.5 mm. The compressed wound body had an approximately elliptical shape in plan-view and the ratio of the major diameter of this shape relative to the minor diameter of this shape was 7.7.

An electrolysis solution was prepared by mixing fluoroethylene carbonate with a mixture of ethylene carbonate and ethyl methyl carbonate (weight ratio=3:7) such as to have a concentration of 5 mass %, dissolving lithium hexafluorophosphate ($LiPF_6$) in the mixture such as to have a concentration of 1 mol/L, and then further adding 2 volume % of vinylene carbonate.

A case made of a specific aluminum laminate was used to house the compressed wound body and 3.2 g of the electrolysis solution. Lead wires were attached at specific positions on the positive and negative electrodes, and then an opening of the case was heat sealed. In this manner, a secondary battery was assembled. The secondary battery had a pouch shape of 35 mm in width, 48 mm in height, and 5 mm in thickness, and had a nominal battery capacity of 720 mAh.

Next, the assembled secondary battery was subjected to aging treatment for 8 hours under conditions of a depth of charge (SOC) of 10% and a temperature of 45° C.

The life characteristics 1 and high-potential life characteristics 1 of the secondary battery were evaluated after the aging treatment. The results are shown in Table 1.

Example 1-2

A hydrogenated polymer, a binder composition for a positive electrode, a slurry composition for a positive electrode, a positive electrode for a secondary battery, a negative electrode for a secondary battery, and a secondary battery were produced in the same way as in Example 1-1 with the exception that in production of the polymer, the amount of acrylonitrile was changed to 45 parts and the amount of 1,3-butadiene was changed to 55 parts. Evaluations were performed in the same way as in Example 1-1. The results are shown in Table 1.

Examples 1-3 and 1-4

In each example, a hydrogenated polymer, a binder composition for a positive electrode, a slurry composition for a positive electrode, a positive electrode for a secondary battery, a negative electrode for a secondary battery, and a secondary battery were produced in the same way as in Example 1-1 with the exception that in production of the polymer, the amounts of acrylonitrile and 1,3-butadiene were as shown in Table 1 and n-butyl acrylate was used as a (meth)acrylic acid ester monomer in the amount shown in Table 1. Evaluations were performed in the same way as in Example 1-1. The results are shown in Table 1.

Example 1-5

A hydrogenated polymer, a binder composition for a positive electrode, a slurry composition for a positive electrode, a positive electrode for a secondary battery, a negative electrode for a secondary battery, and a secondary battery were produced in the same way as in Example 1-1 with the exception that in hydrogenation of the polymer, the reaction time and hydrogen pressure were changed, and the reaction was terminated at an end point at which the iodine value was 15 mg/100 mg. Evaluations were performed in the same way as in Example 1-1. The results are shown in Table 1.

Example 1-6

A hydrogenated polymer, a binder composition for a positive electrode, a slurry composition for a positive electrode, a positive electrode for a secondary battery, a negative electrode for a secondary battery, and a secondary battery were produced in the same way as in Example 1-1 with the exception that the amounts of the Grubbs' catalyst and Wilkinson's catalyst added in metathesis and hydrogenation of the polymer were changed. Evaluations were performed in the same way as in Example 1-1. The results are shown in Table 1.

Example 1-7

A hydrogenated polymer, a binder composition for a positive electrode, a slurry composition for a positive electrode, a positive electrode for a secondary battery, a negative electrode for a secondary battery, and a secondary battery were produced in the same way as in Example 1-1 with the exception that the amounts of the Grubbs' catalyst and Wilkinson's catalyst added in metathesis and hydrogenation of the polymer were changed. Evaluations were performed in the same way as in Example 1-1. The results are shown in Table 1.

Example 1-8

A hydrogenated polymer, a binder composition for a positive electrode, a slurry composition for a positive electrode, a positive electrode for a secondary battery, a negative electrode for a secondary battery, and a secondary battery were produced in the same way as in Example 1-1 with the exception that the amount of the redox polymerization initiator used in production of the polymer was changed to 3.4 times the amount in Example 1-1 (cumene hydroperoxide: 0.34 parts, ethylenediaminetetraacetic acid iron monosodium salt hydrate: 0.034 parts, sodium hydroxymethanesulfinate dihydrate: 0.102 parts, EDTA.4Na.4H$_2$O: 0.068 parts). Evaluations were conducted in the same manner as in Example 1-1. The results are shown in Table 1.

Example 1-9

A hydrogenated polymer, a binder composition for a positive electrode, a slurry composition for a positive electrode, a positive electrode for a secondary battery, a negative electrode for a secondary battery, and a secondary battery were produced in the same way as in Example 1-1 with the exception that the amount of the redox polymerization initiator used in production of the polymer was changed. Evaluations were performed in the same way as in Example 1-1. The results are shown in Table 1.

Example 1-10

A hydrogenated polymer, a binder composition for a positive electrode, a slurry composition for a positive electrode, a positive electrode for a secondary battery, a negative electrode for a secondary battery, and a secondary battery were produced in the same way as in Example 1-1 with the exception that the amount of the redox polymerization initiator used in production of the polymer was changed. Evaluations were performed in the same way as in Example 1-1. The results are shown in Table 1.

Comparative Example 1-1

A hydrogenated polymer, a binder composition for a positive electrode, a slurry composition for a positive electrode, a positive electrode for a secondary battery, a negative electrode for a secondary battery, and a secondary battery were produced in the same way as in Example 1-1 with the exception that iron was removed from the latex of the polymer using an ion-exchange resin prior to carrying out metathesis of the polymer. Evaluations were performed in the same way as in Example 1-1. The results are shown in Table 1.

Comparative Example 1-2

A hydrogenated polymer, a binder composition for a positive electrode, a slurry composition for a positive electrode, a positive electrode for a secondary battery, a negative electrode for a secondary battery, and a secondary battery were produced in the same way as in Example 1-1 with the exception that the amounts of the Grubbs' catalyst and Wilkinson's catalyst added in metathesis and hydrogenation of the polymer were changed. Evaluations were performed in the same way as in Example 1-1. The results are shown in Table 1.

Comparative Example 1-3

A hydrogenated polymer, a binder composition for a positive electrode, a slurry composition for a positive electrode, a positive electrode for a secondary battery, a negative electrode for a secondary battery, and a secondary battery were produced in the same way as in Example 1-1 with the exception that the amounts of the Grubbs' catalyst and Wilkinson's catalyst added in metathesis and hydrogenation of the polymer were changed. Evaluations were performed in the same way as in Example 1-1. The results are shown in Table 1.

Comparative Example 1-4

A hydrogenated polymer, a binder composition for a positive electrode, a slurry composition for a positive electrode, a positive electrode for a secondary battery, a negative electrode for a secondary battery, and a secondary battery were produced in the same way as in Example 1-1 with the exception that the amount of the redox polymerization initiator used in production of the polymer was changed. Evaluations were performed in the same way as in Example 1-1. The results are shown in Table 1.

TABLE 1

| | | | Example 1-1 | Example 1-2 | Example 1-3 | Example 1-4 | Example 1-5 | Example 1-6 | Example 1-7 | Example 1-8 | Example 1-9 | Example 1-10 | Comparative Example 1-1 | Comparative Example 1-2 | Comparative Example 1-3 | Comparative Example 1-4 |
|---|---|---|---|---|---|---|---|---|---|---|---|---|---|---|---|---|
| Slurry composition | Positive electrode active material | Lithium cobalt oxide [parts by mass] | 100 | 100 | 100 | 100 | 100 | 100 | 100 | 100 | 100 | 100 | 100 | 100 | 100 | 100 |
| | Conductive material | Acetylene black [parts by mass] | 2 | 2 | 2 | 2 | 2 | 2 | 2 | 2 | 2 | 2 | 2 | 2 | 2 | 2 |
| | Binder composition | Binder Pre-hydrogenation polymer composition | 1,3-Butadiene monomer unit [mass %] | 65 | 55 | 65 | 25 | 65 | 65 | 65 | 65 | 65 | 65 | 65 | 65 | 65 | 65 |
| | | | Acrylonitrile monomer unit [mass %] | 35 | 45 | 21 | 50 | 35 | 35 | 35 | 35 | 35 | 35 | 35 | 35 | 35 | 35 |
| | | | n-Butyl acrylate monomer unit [mass %] | 0 | 0 | 14 | 25 | 0 | 0 | 0 | 0 | 0 | 0 | 0 | 0 | 0 | 0 |
| | | | Degree of swelling in electrolysis solution [mass %] | 250 | 400 | 200 | 500 | 250 | 250 | 250 | 250 | 250 | 250 | 250 | 250 | 250 | 250 |
| | | | Iodine value [mg/100 mg] | 1.3 | 1.3 | 1.3 | 1.3 | 15 | 1.3 | 1.3 | 1.3 | 1.3 | 1.3 | 1.3 | 1.3 | 1.3 | 1.3 |
| | | | Amount [parts by mass] | 2.0 | 2.0 | 2.0 | 2.0 | 2.0 | 2.0 | 2.0 | 2.0 | 2.0 | 2.0 | 2.0 | 2.0 | 2.0 | 2.0 |
| | | | Total iron, ruthenium, and rhodium content [×10⁻³ parts by mass/100 parts by mass of binder] | 1.4 | 1.4 | 1.4 | 1.4 | 1.4 | 1.3 | 4.4 | 4.2 | 3.1 | 0.4 | 0.2 | 7.2 | 8.2 | 7.2 |
| | | | Iron content [×10⁻³ parts by mass/100 parts by mass of binder] | 1.2 | 1.2 | 1.2 | 1.2 | 1.2 | 0.1 | 1.2 | 4.0 | 2.9 | 0.2 | 0 | 1.2 | 1.2 | 7.0 |
| | | | Total ruthenium and rhodium content [×10⁻³ parts by mass/100 parts by mass of binder] | 0.2 | 0.2 | 0.2 | 0.2 | 0.2 | 1.2 | 3.2 | 0.2 | 0.2 | 0.2 | 0.2 | 6.0 | 7.0 | 0.2 |
| Evaluation | | Through-resistance | A | A | A | D | A | A | A | A | A | A | A | C | C | C |
| | | Life characteristics 1 | A | A | A | B | A | B | B | C | B | B | E | D | D | E |
| | | High-potential life characteristics 1 | A | A | A | B | C | C | C | B | A | A | D | E | E | D |

It can be seen from Table 1 that non-aqueous secondary batteries having excellent life characteristics were obtained in Examples 1-1 to 1-10 even though aging treatment was carried out under low-temperature and low-depth of charge conditions. On the other hand, it can be seen that non-aqueous secondary battery life characteristics decreased in Comparative Examples 1-1 to 1-4.

Experiment 2

Example 2-1

[Production of Hydrogenated Polymer]

A hydrogenated polymer was obtained in the same way as in Example 1-1 by producing a polymer and then carrying out metathesis and hydrogenation of the polymer.

[Production of Binder Composition for Positive Electrode]

A sample of 64 parts of an aqueous dispersion of the obtained hydrogenated polymer, in terms of solid content, was taken and 800 parts of N-methylpyrrolidone (NMP) was added thereto as a solvent. Water was then evaporated under reduced pressure to yield a binder composition (NMP solution) containing the hydrogenated polymer as a binder. The iodine value and degree of swelling in electrolysis solution of the hydrogenated polymer were measured. Moreover, the iron, ruthenium, and rhodium contents in the obtained binder composition were measured. The results are shown in Table 2.

[Production of Slurry Composition for Positive Electrode]

A planetary mixer was charged with 100 parts of lithium cobalt oxide ($LiCoO_2$; volume-average particle diameter: 20 μm) as a positive electrode active material, a mixture of 1.8 parts of acetylene black (volume-average particle diameter: 48 nm) and 0.2 parts of carbon nanotubes (HiPco® (HiPco is a registered trademark in Japan, other countries, or both) produced by Unidym; average diameter: 26 nm; specific surface area: 700 $m^2/g$) (specific surface area after mixing: 190 $m^2/g$) as a conductive material, 1.6 parts of a fluorine-containing polymer (copolymer of vinylidene fluoride and a polar group-containing unsaturated compound; melt viscosity: 5.0 kPa·s) as a second binder, the binder composition in an amount such that 0.4 parts of the hydrogenated polymer, in terms of solid content, was present, and an appropriate amount of NMP as a solvent. Stirring was performed for 60 minutes with a solid content concentration such that shear during thick-kneading was 680 W/kg. At this time, the solid content concentration was 78 mass %. Thereafter, further NMP was added and further kneading was performed using the planetary mixer such that the viscosity at a shear rate of 20 $s^{-1}$ was approximately 4,000 mPa·s to yield a slurry composition for a positive electrode.

[Production of Positive Electrode for Secondary Battery]

Aluminum foil of 15 μm in thickness was prepared as a current collector. The obtained slurry composition for a positive electrode was applied onto both sides of the aluminum foil such as to have an application amount after drying of 20 mg/$cm^2$. The slurry composition for a positive electrode was dried for 20 minutes at 120° C., and was then heat treated for 2 hours at 150° C. to obtain a positive electrode web. The obtained positive electrode web was rolled by roll pressing to produce a sheet-shaped positive electrode including the aluminum foil (current collector) and a positive electrode mixed material layer having a density of 3.7 g/$cm^3$. The sheet-shaped positive electrode was cut to 4.8 cm in width and 50 cm in length for use as a positive electrode.

[Production of Negative Electrode for Secondary Battery]

A negative electrode of 5.0 cm in width and 52 cm in length was produced in the same way as in Example 1-1.

[Production of Secondary Battery]

A secondary battery was obtained in the same way as in Example 1-1 using the produced positive and negative electrodes.

The life characteristics 2 and high-potential life characteristics 2 of the secondary battery were evaluated after aging treatment. The results are shown in Table 2.

Example 2-2

A hydrogenated polymer, a binder composition for a positive electrode, a slurry composition for a positive electrode, a positive electrode for a secondary battery, a negative electrode for a secondary battery, and a secondary battery were produced in the same way as in Example 2-1 with the exception that 1.6 parts of another fluorine-containing polymer (polyvinylidene fluoride; melt viscosity: 5.0 kPa·s) was used as the second binder in production of the slurry composition for a positive electrode. Evaluations were performed in the same way as in Example 2-1. The results are shown in Table 2.

Example 2-3

A hydrogenated polymer, a binder composition for a positive electrode, a slurry composition for a positive electrode, a positive electrode for a secondary battery, a negative electrode for a secondary battery, and a secondary battery were produced in the same way as in Example 2-1 with the exception that 1.6 parts of another fluorine-containing polymer (copolymer of vinylidene fluoride and a polar group-containing unsaturated compound; melt viscosity: 3.0 kPa·s) was used as the second binder in production of the slurry composition for a positive electrode. Evaluations were performed in the same way as in Example 2-1. The results are shown in Table 2.

Example 2-4

A hydrogenated polymer, a binder composition for a positive electrode, a slurry composition for a positive electrode, a positive electrode for a secondary battery, a negative electrode for a secondary battery, and a secondary battery were produced in the same way as in Example 2-1 with the exception that 1.6 parts of another fluorine-containing polymer (copolymer of vinylidene fluoride and a polar group-containing unsaturated compound; melt viscosity: 1.0 kPa·s) was used as the second binder in production of the slurry composition for a positive electrode. Evaluations were performed in the same way as in Example 2-1. The results are shown in Table 2.

Examples 2-5 and 2-6

In each example, a hydrogenated polymer, a binder composition for a positive electrode, a slurry composition for a positive electrode, a positive electrode for a secondary battery, a negative electrode for a secondary battery, and a secondary battery were produced in the same way as in Example 2-1 with the exception that in production of the slurry composition for a positive electrode, the fluorine-containing polymer used as the second binder and the binder composition for a positive electrode were added such that the amounts of the fluorine-containing polymer and the hydrogenated polymer were changed to 1.9 parts of the fluorine-containing polymer and 0.1 parts of the hydrogenated polymer in the case of Example 2-5, and 1.2 parts of the fluorine-containing polymer and 0.8 parts of the hydrogenated polymer in the case of Example 2-6. Evaluations were performed in the same way as in Example 2-1. The results are shown in Table 2.

Comparative Example 2-1

A slurry composition for a positive electrode, a positive electrode for a secondary battery, a negative electrode for a secondary battery, and a secondary battery were produced in the same way as in Example 2-1 with the exception that a hydrogenated polymer and a binder composition for a positive electrode were not produced, and in production of the slurry composition for a positive electrode, 2.0 parts of another fluorine-containing polymer (copolymer of vinylidene fluoride and a polar group-containing unsaturated compound; melt viscosity: 1.0 kPa·s) was used as the second binder and a binder composition for a positive electrode was not used. Evaluations were performed in the same way as in Example 2-1. The results are shown in Table 2.

positive electrode, and a positive electrode for a secondary battery were produced in the same way as in Example 2-1 with the exception that in production of the slurry composition for a positive electrode, a fluorine-containing polymer was not used as a second binder and the binder composition for a positive electrode was added such that the amount of the hydrogenated polymer was 2.0 parts, the occurrence of positive electrode active material sedimentation and binder migration during drying of the slurry composition for a positive electrode to form the positive electrode mixed material layer was confirmed to an extent that was not substantially problematic. This result demonstrates that positive electrode active material sedimentation and binder migration can be inhibited, even when a slurry composition for a positive electrode is dried at high-temperature, by forming a positive electrode for a non-aqueous secondary battery using a specific binder composition in combination with a fluorine-containing polymer.

INDUSTRIAL APPLICABILITY

According to the present disclosure, it is possible to provide a binder composition for a non-aqueous secondary

TABLE 2

| | | | Example 2-1 | Example 2-2 | Example 2-3 | Example 2-4 | Example 2-5 | Example 2-6 | Comparative Example 2-1 |
|---|---|---|---|---|---|---|---|---|---|
| Slurry composition | Positive electrode active material | Lithium cobalt oxide [parts by mass] | 100 | 100 | 100 | 100 | 100 | 100 | 100 |
| | Conductive material | Acetylene black [parts by mass] | 1.8 | 1.8 | 1.8 | 1.8 | 1.8 | 1.8 | 1.8 |
| | | Carbon nanotubes [parts by mass] | 0.2 | 0.2 | 0.2 | 0.2 | 0.2 | 0.2 | 0.2 |
| | Binder Composition | Hydrogenated polymer composition — Hydrogenated 1,3-butadiene unit [mass %] | 65 | 65 | 65 | 65 | 65 | 65 | — |
| | | Acrylontrile monomer unit [mass %] | 35 | 35 | 35 | 35 | 35 | 35 | — |
| | | Degree of swelling in electrolysis solution [mass %] | 250 | 250 | 250 | 250 | 250 | 250 | — |
| | | Iodine value [mg/100 mg] | 1.3 | 1.3 | 1.3 | 1.3 | 1.3 | 1.3 | — |
| | | Amount [parts by mass] | 0.4 | 0.4 | 0.4 | 0.4 | 0.1 | 0.8 | 0 |
| | | Total iron, ruthenium, and rhodium content [$\times 10^{-3}$ parts by mass/100 parts by mass of hydrogenated polymer] | 1.4 | 1.4 | 1.4 | 1.4 | 1.4 | 1.4 | — |
| | | Iron content [$\times 10^{-3}$ parts by mass/100 parts by mass of hydrogenated polymer] | 1.2 | 1.2 | 1.2 | 1.2 | 1.2 | 1.2 | — |
| | | Total ruthenium and rhodium content [$\times 10^{-3}$ parts by mass/100 parts by mass of hydrogenated polymer] | 0.2 | 0.2 | 0.2 | 0.2 | 0.2 | 0.2 | — |
| | fluorine-containing polymer | Inclusion of polar group-containing unsaturated compound monomer unit | Yes | No | Yes | Yes | Yes | Yes | Yes |
| | | Melt viscosity [kPa•s] | 5.0 | 5.0 | 3.0 | 1.0 | 5.0 | 5.0 | 1.0 |
| | | Amount [parts by mass] | 1.6 | 1.6 | 1.6 | 1.6 | 1.9 | 1.2 | 2.0 |
| | | Proportion (fluorine-containing polymer/ (hydrogenated polymer + fluorine-containing polymer)) [mass %] | 80 | 80 | 80 | 80 | 95 | 60 | 100 |
| Evaluation | | Life characteristics 2 | A+ | A | A- | C | B | C | D |
| | | High-potential life characteristics 2 | A+ | A | A- | C | B | C | D |

It can be seen from Table 2 that non-aqueous secondary batteries having sufficiently good life characteristics were obtained in Examples 2-1 to 2-6 even though aging treatment was carried out under low-temperature and low-depth of charge conditions. On the other hand, it can be seen that non-aqueous secondary battery life characteristics decreased in Comparative Example 2-1.

Moreover, when a hydrogenated polymer, a binder composition for a positive electrode, a slurry composition for a battery positive electrode and a composition for a non-aqueous secondary battery positive electrode that can form a positive electrode with which it is possible to obtain a non-aqueous secondary battery having excellent life characteristics even when aging treatment is carried out under low-temperature and low-depth of charge conditions.

Moreover, according to the present disclosure, it is possible to provide a positive electrode for a non-aqueous secondary battery with which it is possible to obtain a non-aqueous secondary battery having excellent life characteristics even when aging treatment is carried out under low-temperature and low-depth of charge conditions.

Furthermore, according to the present disclosure, it is possible to provide a non-aqueous secondary battery having excellent life characteristics.

The invention claimed is:

1. A binder composition for a non-aqueous secondary battery positive electrode, comprising:
    a first binder; iron; and at least one of ruthenium and rhodium, wherein
    total iron, ruthenium, and rhodium content is no greater than $5 \times 10^{-3}$ parts by mass per 100 parts by mass of the first binder, and
    iron content is at least $4 \times 10^{-5}$ parts by mass and no greater than $4 \times 10^{-3}$ parts by mass per 100 parts by mass of the first binder.

2. The binder composition for a non-aqueous secondary battery positive electrode of claim 1, wherein
    total ruthenium and rhodium content is at least $4 \times 10^{-5}$ parts by mass and no greater than $4 \times 10^{-3}$ parts by mass per 100 parts by mass of the first binder.

3. The binder composition for a non-aqueous secondary battery positive electrode of claim 1, wherein
    the first binder includes a polymer including an alkylene structural unit and a nitrile group-containing monomer unit.

4. The binder composition for a non-aqueous secondary battery positive electrode of claim 3, wherein
    the polymer has a degree of swelling in electrolysis solution of at least 200 mass % and no greater than 700 mass %.

5. The binder composition for a non-aqueous secondary battery positive electrode of claim 3, wherein
    the polymer has an iodine value of at least 0.01 mg/100 mg and no greater than 65 mg/100 mg.

6. The binder composition for a non-aqueous secondary battery positive electrode of claim 3, wherein
    the polymer includes the alkylene structural unit in a proportion of at least 20 mass % and no greater than 90 mass % and includes the nitrile group-containing monomer unit in a proportion of at least 10 mass % and no greater than 60 mass %.

7. A composition for a non-aqueous secondary battery positive electrode, comprising:
    a positive electrode active material; a conductive material; and the binder composition for a non-aqueous secondary battery positive electrode of claim 1.

8. A composition for a non-aqueous secondary battery positive electrode, comprising:
    the binder composition for a non-aqueous secondary battery positive electrode of claim 1; and a second binder, wherein
    the second binder includes a fluorine-containing polymer.

9. The composition for a non-aqueous secondary battery positive electrode of claim 8, wherein
    the fluorine-containing polymer has a melt viscosity of at least 1.0 kPa·s.

10. The composition for a non-aqueous secondary battery positive electrode of claim 8, wherein
    the second binder is contained in a proportion of at least 50 mass % and no greater than 99.9 mass % relative to total content of the first binder and the second binder.

11. The composition for a non-aqueous secondary battery positive electrode of claim 8, wherein
    the fluorine-containing polymer includes a vinylidene fluoride unit.

12. The composition for a non-aqueous secondary battery positive electrode of claim 8, further comprising
    a conductive material.

13. The composition for a non-aqueous secondary battery positive electrode of claim 8, further comprising
    a positive electrode active material.

14. The composition for a non-aqueous secondary battery positive electrode of claim 8, further comprising
    a positive electrode active material and a conductive material.

15. A method for producing the composition for a non-aqueous secondary battery positive electrode of claim 8, comprising
    mixing the binder composition for a non-aqueous secondary battery positive electrode and the second binder.

16. A positive electrode for a non-aqueous secondary battery, comprising
    a positive electrode mixed material layer formed using the composition for a non-aqueous secondary battery positive electrode of claim 7.

17. A method for producing a positive electrode for a non-aqueous secondary battery, comprising:
    applying the composition for a non-aqueous secondary battery positive electrode of claim 7 onto a current collector; and
    drying the composition for a non-aqueous secondary battery positive electrode that has been applied to form a positive electrode mixed material layer at a temperature of at least 120° C.

18. A non-aqueous secondary battery comprising:
    the positive electrode for a non-aqueous secondary battery of claim 16; a negative electrode; an electrolysis solution; and a separator.

19. A method for producing a non-aqueous secondary battery, comprising:
    assembling a non-aqueous secondary battery including the positive electrode for a non-aqueous secondary battery of claim 16, a negative electrode, an electrolysis solution, and a separator; and
    subjecting the non-aqueous secondary battery that has been assembled to aging treatment, wherein
    the aging treatment is carried out under conditions of a depth of charge of no greater than 13% and a temperature of no higher than 55° C.

* * * * *